(12) United States Patent
Yu et al.

(10) Patent No.: US 11,580,335 B2
(45) Date of Patent: Feb. 14, 2023

(54) TRANSACTION MANAGEMENT OF MACHINE LEARNING ALGORITHM UPDATES

(71) Applicant: General Electric Company, Schenectady, NY (US)

(72) Inventors: Long Yu, Wauwatosa, WI (US); Brian J. Young, Slinger, WI (US)

(73) Assignee: General Electric Company, Schenectady, NY (US)

( * ) Notice: Subject to any disclaimer, the term of this patent is extended or adjusted under 35 U.S.C. 154(b) by 988 days.

(21) Appl. No.: 16/373,009

(22) Filed: Apr. 2, 2019

(65) Prior Publication Data
US 2020/0320349 A1 Oct. 8, 2020

(51) Int. Cl.
| | |
|---|---|
| *G06K 9/62* | (2022.01) |
| *G06F 21/62* | (2013.01) |
| *H04L 9/32* | (2006.01) |
| *G06N 20/00* | (2019.01) |
| *H04L 9/06* | (2006.01) |
| *H04L 9/00* | (2022.01) |

(52) U.S. Cl.
CPC ....... *G06K 9/6262* (2013.01); *G06F 21/6254* (2013.01); *G06K 9/6257* (2013.01); *G06N 20/00* (2019.01); *H04L 9/0637* (2013.01); *H04L 9/3236* (2013.01); *H04L 9/50* (2022.05)

(58) Field of Classification Search
CPC ..................................................... G06N 20/00
USPC ....................................... 709/213, 217, 224
See application file for complete search history.

(56) References Cited

U.S. PATENT DOCUMENTS

| | | | | |
|---|---|---|---|---|
| 2019/0012595 | A1* | 1/2019 | Beser | G06Q 20/36 |
| 2019/0303920 | A1* | 10/2019 | Balaraman | H04L 63/12 |
| 2019/0306173 | A1* | 10/2019 | Reddy | G06F 11/3604 |
| 2020/0210850 | A1* | 7/2020 | Nuthi | G06N 3/10 |

* cited by examiner

*Primary Examiner* — Kiet M Doan

(57) ABSTRACT

Computer-implemented techniques for managing transactions of machine learning algorithm updates are described. In one embodiment, a computer-implemented is provided that comprises receiving, by a system operatively coupled to a processor, a request for an update to a machine learning model associated with a software program, wherein the request is received in accordance with a defined blockchain protocol, and wherein the request comprises model development data used in association with optimization of an instance of the machine learning model. The method further comprises, employing, by the system, a blockchain network to facilitate managing fulfillment of the request.

23 Claims, 14 Drawing Sheets ental stages of the machine learning model are controlled by a regulatory policy (e.g., wherein the machine learning model comprises a medical device software product), the request further comprises compliance information declaring that the model development data complies with the regulatory policy.

TRANSACTION MANAGEMENT OF MACHINE LEARNING ALGORITHM UPDATES

TECHNICAL FIELD

This application relates to computer-implemented techniques for managing transactions of machine learning algorithm updates.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments described herein, systems, computer-implemented methods, apparatus and/or computer program products are provided that facilitate managing transactions of machine learning algorithm updates.

According to an embodiment, a device is provided that comprises a memory that stores computer executable components and a processor that executes the computer executable components stored in the memory. The computer executable components comprise a reception component that receives a request for an update to a machine learning model associated a software program, wherein the request is received in accordance with a defined blockchain protocol, and wherein the request comprises model development data used in association with optimization of an instance of the machine learning model. The computer executable components further comprise a transaction management component that employs a blockchain system to facilitate managing fulfillment of the request. For example, the transaction management component can employ the blockchain system to receive the request, facilitate verifying the request can be fulfilled, facilitate generating an updated version of the machine learning model, facilitate distributing the updated version of the machine learning model to the requesting entity, and the like. The transaction management component can also employ the blockchain system to record transaction information regarding the request and the fulfillment of the request using a blockchain data structure.

In various embodiments, the computer executable components further comprise a model update component that generates an updated version of the machine learning model based on the model development data. In some implementations of these embodiments, the transaction management component employs the blockchain system to determine whether the update is validated, and the model update component generates the updated version of the machine learning model based on a determination that the update is validated. The computer executable components can further comprise a software update component that generates update data for incorporating the updated version of the machine learning model into the software program, and a distribution component that provides the update data to an authorized entity associated with the request, resulting in the fulfillment of the request.

The model development data sent with the request can comprise training data used to train the instance of the machine learning model, test data set used to test the instance of the machine learning model, and validation results data generated based on application of the test data to instance of the machine learning model. For example, in some implementations, the software program comprises an optimization component that trains the instance of the machine learning model based on the training data and evaluates performance of the instance of the machine learning model based on the test data, resulting in the validation results data. The optimization component can also prevent access to model information defining a structure, parameters, and parameter weights of the instance of the machine learning model. With these implementations, the reception component can receive the request based on the validation results data indicating the performance of the instance of the machine learning model exceeds a defined performance level.

In some embodiments, updates to the software program are controlled by a regulatory policy. For example, in one implementation, the software program can be or include a medical device software product, wherein clinical use of the medical device software product requires clearance and approval by a regulatory agency (e.g., the Food and Drug Administration (FDA) in accordance with define rules and regulations). In accordance with these embodiments, the request can further comprise compliance information declaring that the model development data complies with the regulatory policy and/or documenting compliance with the regulatory policy in association with generation and utilization of the model development data.

In another embodiment, a device is provided that comprises a memory that stores computer executable components and a processor that executes the computer executable components stored in the memory. The computer executable components can comprise a model update transaction component that sends a request to a software update management system for an update to a machine learning model. The model update transaction component can further receive the update from the software update management system based on verification of the update using a blockchain network, resulting in fulfillment of the request, wherein based on the fulfillment of the request, transaction information regarding the request and the fulfillment of the request is recorded in a blockchain data structure accessed via the blockchain network. In various implementations, the software update management system employs the blockchain network and an associated blockchain protocol to facilitate reception and fulfillment of the request. The model update transaction component can further encrypt the request in accordance with the blockchain protocol.

In one or more implementations, the computer executable components further comprise a training component that employs an optimization application associated with a software program comprising the machine learning model to train an instance of the machine learning model on a training data set. The computer executable components further comprise an evaluation component that employs the optimization application to evaluate performance of the instance of the machine learning model based on validation results generated in association with application of the instance of the machine learning model to a test data set. In some implementations, the model update transaction component sends the request to the software update management system based on a determination that the performance exceeds a defined performance level.

In some implementations, the request comprises the training data, the test data and the validation results. The software update management system can further employ the training data, test data and/or validation results to facilitate generating the update. In addition, in embodiments in which development and/or usage of the machine learning model is controlled by a regulatory policy (e.g., if the machine learning model is or is associated with medical device software), the request can also comprise compliance information that affirms or documents compliance with the regulatory policy in association with generation and utilization of the training data, the test data and the validation results.

In some embodiments, elements described in the disclosed systems can be embodied in different forms such as a computer-implemented method, a computer program product, or another form.

DETAILED DESCRIPTION

Figure 1:
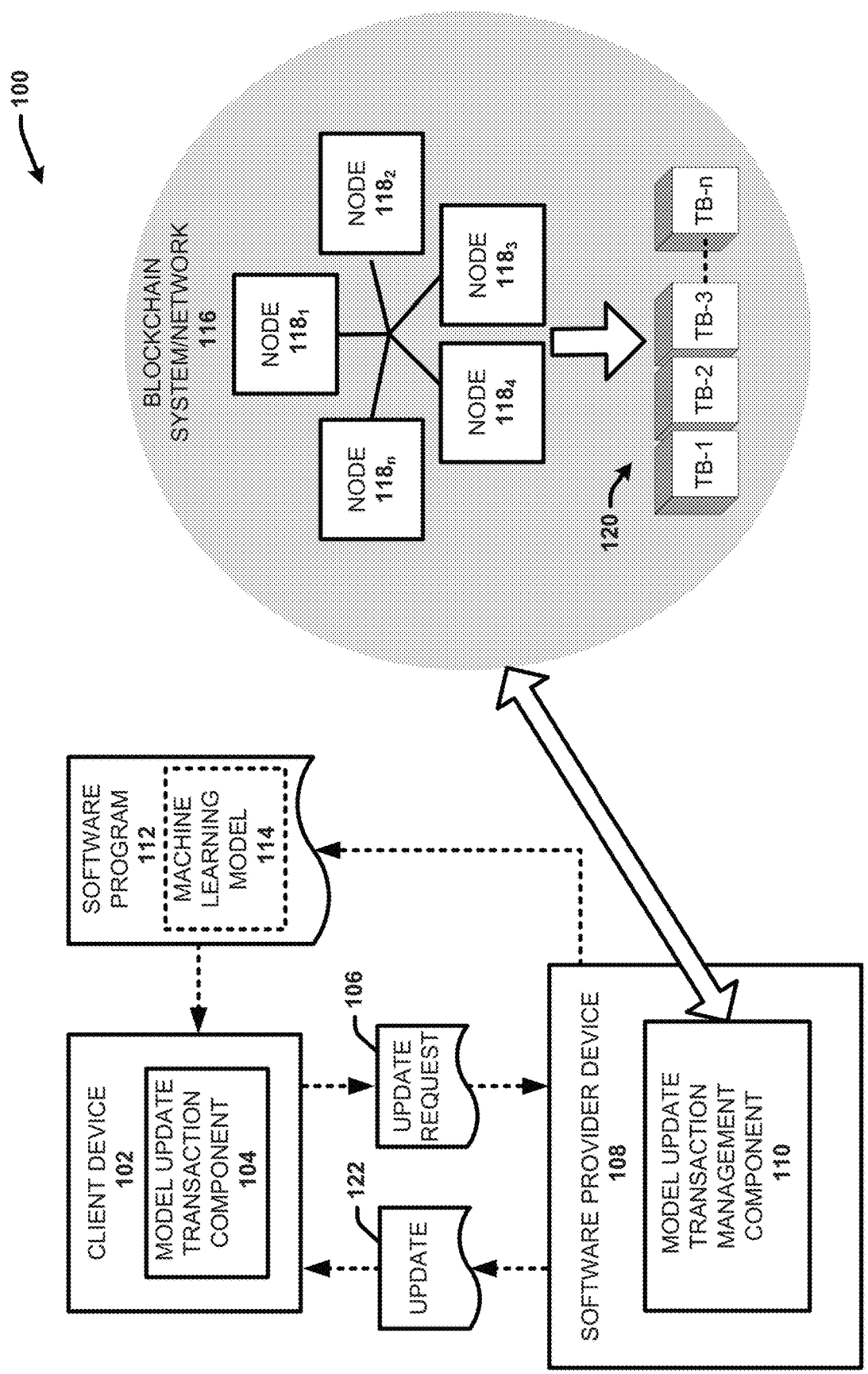
FIG. 1 illustrates a block diagram of an example, non-limiting system that facilitates managing transactions of machine learning algorithm updates in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Summary section or in the Detailed Description section.

Artificial intelligence (AI) and machine learning (ML) is a rapidly progressing technical field impacting a wide range of industries. Advancements in machine learning technologies such as deep neural networks and have recently shown impressive performance, sometimes exceeding humans, in various AI domains, including computer vision, speech, natural language processing (NPL), bioinformatics, drug design, medical image analysis, and more. As machine learning algorithms continue to evolve to enable increasingly more sophisticated and precise automated inferencing capabilities, the goal of keeping AI's impact on society beneficial has drawn attention to areas of verification, validity, security and control. For example, while NLP technical errors of an AI personal assistant in interpreting everyday commands may be irritating, and in some cases amusing, the accuracy of AI based outputs becomes much more important when they control cars, planes, automated trading systems, power grids, security systems, etc.

The performance accuracy of machine learning models/algorithms used in the medical context is of critical importance, particularly in scenarios in which the output of the machine learning models/algorithms control the operation of a life sustaining medical device. Medical software refers to any software or system used within a medical context, such as standalone software used for diagnostic or therapeutic purposes, software embedded in a medical device, software that drives a medical device or determines how it is used, software that acts as an accessory to a medical device, software used in the design, production, and testing of a medical device, and software that provides quality control management of a medical device. In this regard, medical software can include software located within a medical device as well as software located at an external device/system (e.g., the cloud, a remote server, etc.) that can be accessed and applied for a medical purpose. The regulatory environment for medical software can have varying requirements and levels of scrutiny depending on the type, intended use, and level of risk associated with the software. For example, prior to authorized usage in clinical practice as a "cleared medical product," some regulatory agencies require software classified as a medical device, often referred to as software as a medical device (SaMD), to comply with the same regulatory pathway used for tangible medical devices.

The introduction of AI and machine learning applications into medical software has created new regulatory challenges do the adaptive nature of these software tools. In particular, the performance specificity and accuracy of machine learning algorithms depends on the training data used to develop them. This allows machine learning algorithms to learn and adapt based on exposure to new/more data, thus enabling regular or continuous optimization of performance specificity and accuracy. However, under the existing model of medical device regulation, a machine learning algorithm will be verified and validated, and then submitted for approval. Once approved, modifications to the algorithm could potentially be time-consuming and costly depending on the need for additional regulatory review and approval to ensure the safety and efficacy of the updated medical software product. Thus, the advancement of machine learning technology in medicine and other regulated industries is hindered by the lack of efficient regulatory and quality control techniques for achieving software updates.

The disclosed subject matter provides a framework that is capable of meeting the scientific integrity and traceability demands for providing machine learning model/algorithm updates that would meet the rigors of scientific, regulatory and/or manufacturer quality system scrutiny, such as those associated with the medical software industry. In particular, the disclosed framework provides computer readable media systems, computer-implemented methods, apparatus and/or computer program products that employ blockchain technology to facilitate managing transactions between consumers of software products that employ one or more machine learning components (e.g., one or more machine learning algorithms or models) and an entity that manages and/or provides the software products.

In various embodiments, a machine learning optimization tool is described that can be provided to the consuming entity (e.g., the entity the uses the software product in clinical/commercial practice) in association with a software product including one or more machine learning models or algorithms. The optimization tool can facilitate local (e.g., client side) training and tailoring of an instance of the machine learning model, evaluating the performance of the trained/tailored version of the model, and documenting validation, training and testing data in accordance with defined scientific and regulatory standards. The role of the consuming entity is to submit this model development input and output data in a transactional request to provide an algorithm update from the algorithm managing entity. The algorithm managing entity can further employ the submitted data to facilitate generating the update and providing the update to the consuming entity in accordance with a software update agreement established between the two parties, resulting in fulfillment of the request. The technical framework used for receiving and fulfilling the request model update request is blockchain, which provides a secure, encrypted and tamper-proof method of handling the transaction that will maintain the security and privacy of the transaction to any outside parties. In addition, the usage of blockchain technology for managing the transaction provides a secure and protected mechanism for ensuring traceability of data, inputs, outputs, and transaction details that will guarantee integrity of information, and traceable information for quality and regulatory purposes.

In this regard, the disclosed techniques provide for managing all the following elements that are generally required to perform a controlled transaction to update a machine learning algorithm: 1) legal and financial transaction information between user and provider of the algorithm update, 2) data and performance integrity for training/test data sets and performance bench marking history, 3) final performance validation documentation using test data, 4) security and privacy for transaction, and 5) archival of documentation and traceability artifacts required for regulatory and scientific rigor. The disclosed techniques combine these elements through the use of blockchain technology to provide a framework for secure management of machine learning algorithm updates that can guarantee the scientific regulatory, legal and financial rigor for update transactions. As a result, the disclosed techniques provide a framework to execute machine learning algorithm update transactions and enable a commercialization of transactions around machine learning algorithms.

Various embodiments of the disclosed techniques for managing transactions of machine learning algorithm updates are exemplified in association with application in the healthcare domain. For example, one or more embodiments of the disclosed subject matter provide techniques for managing transactions of updates to machine learning models/algorithms that are used in medical device software products, such as machine learning models that provide clinical diagnosis, machine learning models that control operations of a medical device, and the like. However, the disclosed techniques are not limited to the healthcare domain. In this regard, the disclosed techniques can be applied to facilitate and manage transactions for machine learning software updates used in various domains, especially domains in which the scientific integrity and traceability of the updates is essential for ensuring the development of AI technology that provides a positive impact on society.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 illustrates a block diagram of an example, non-limiting system 100 that facilitates managing transactions of machine learning algorithm updates in accordance with one or more embodiments of the disclosed subject matter. Embodiments of systems described herein can include one or more machine-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described.

System 100 includes a client device 102, a software provider device 108 and a blockchain system/network 116. The client device 102 can include any suitable computing device associated with an entity that can receive and apply a machine learning model provided by another entity (e.g., an entity associated with the software provider device 108), and that is configured to request and receive updates to the machine learning model in accordance with various embodiments described herein. For example, in the embodiment shown, the client device 102 can receive a software program 112 from the software provider device 108. The software program can include a machine learning model 114 (or a plurality of machine learning models/algorithms) that can be executed by the client device 102 and/or another device or system coupled to the client device 102. The terms machine learning model, machine learning algorithm and machine learning component are used herein interchangeably. The machine learning model 114 can include various types of machine learning algorithms and statistical models that can be used by a computing system to perform tasks without explicit instructions relaying on patterns and inferences instead. The client device 102 can include model update transaction component 104 to facilitate requesting and receiving updates to the machine learning model 114 from the software provider device 108. For example, in the embodiment shown, the client device 102 can send an update request 106 to the software provider device 108, wherein the update request 106 can include information requesting an update to the machine learning model 114. The client device 102 can further receive the update 122 from the software provider device 108 based on the update request 106 in accordance with the various techniques described herein for managing fulfillment of the request by the software provider device 108. The update 122 can include an updated version of the machine learning model 114 that can replace an original version or previous version of the machine learning model 114. For example, the update 122 can include update data defining adjustments to one or more parameters, parameter weights and/or a structure of the machine learning model 114.

The software provider device 108 can include any suitable device associated with an entity that receives, manages and facilitates providing machine learning model updates to a client device 102. In the embodiment shown, the software provider device 108 can also provide the software program 112 including the machine learning model 114 (or a plurality of machine learning models). However, in other embodiments, the source of the software program 112 can vary. The software provider device 108 can include model update transaction management component 110 to facilitate receiving an update request 106, managing fulfillment of the update request 106, and providing the update 122 back to the client device 102. In this regard, the model update transaction management component 110 can facilitate managing a transaction between the client device 102 and the software provider device 108 for an update to a machine learning model/algorithm. As discussed infra, in various embodiments, the software provider device 108 can employ a blockchain system/network 116 to facilitate managing transactions for machine learning model updates between a user and provider of a machine learning model.

For example, in one or more implementations, the client device 102 can include a device that is associated with a healthcare organization that employs a proprietary medical software product provided by the software provider device 108, wherein the medical software product comprises one or more machine learning models/algorithms. In accordance with this example, the software provider device 108 can control and manage generation and provision of updates (e.g., update 122) to the one or more machine learning models/algorithms included with the medical software product.

Figure 2:
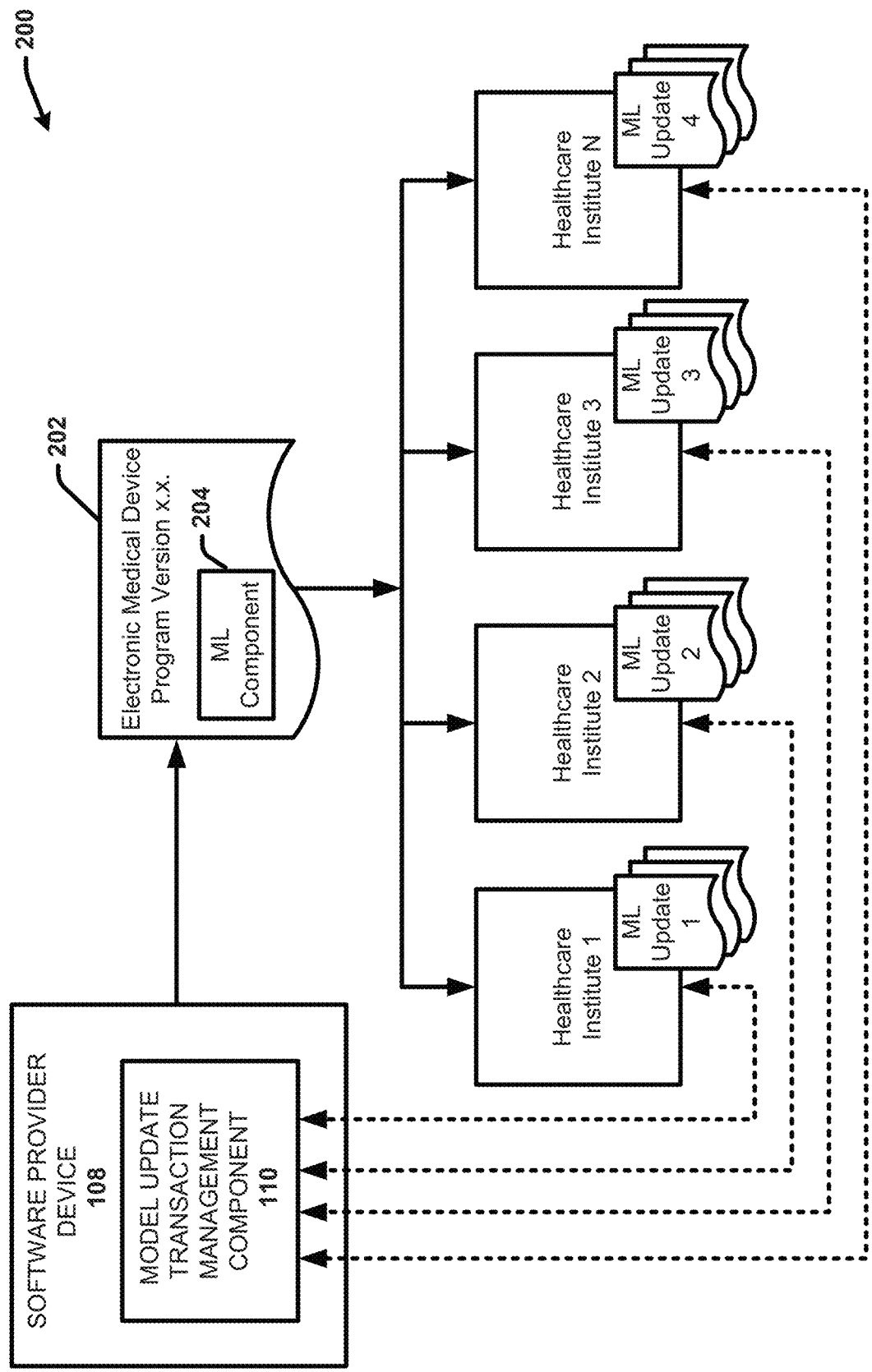
FIG. 2 illustrates a block diagram of an example, non-limiting system that facilitates managing transactions of updates to a machine learning algorithm that is or is included with a medical device software program in accordance with one or more embodiments of the disclosed subject matter.

For instance, FIG. 2 illustrates a block diagram of an example, non-limiting system 200 that facilitates managing transactions of updates to a machine learning algorithm/model that is or is included with a medical device software program in accordance with one or more embodiments of the disclosed subject matter. Repetitive description of like elements employed in respective embodiments is omitted for sake of brevity.

With reference to FIG. 2 in view of FIG. 1, system 200 includes a plurality of healthcare institutes, respectively identified as healthcare institute 1, healthcare institute 2, healthcare institute 3, and healthcare institute N. The number of healthcare institutes (N) can vary. System 200 further includes software provider device 108. The healthcare institutes can include for example, hospitals, hospital systems, outpatient care facilities, ambulatory systems, assisted living facilitates, or the like. In this regard, the healthcare institutes can respectively include any entity that uses the electronic medical device program 202 in association with operations of the healthcare institute (e.g., in accordance with a purchase and/or licensing agreement between the healthcare institute and the provider of the electronic medical device program 202). In accordance with system 200, each of the healthcare institutes can include or otherwise be associated with a client device 102. In this regard, each of the healthcare institutes can include or otherwise have access to a model update transaction component 104 to request and receive updates to a machine learning component (e.g., ML component 204) of the electronic medical device program 202.

In the embodiment shown, the software provider device 108 can provide the electronic medical device program 202 to the respective healthcare institutes. For example, the electronic medical device program 202 can include a proprietary medical device software program known as version x.x. Version x.x. of the electronic medical device program 202 includes a ML component 204 that has been cleared for clinical use (e.g., by the FDA) by the respective healthcare institutes. The ML component 204 can be or correspond to one or more machine learning algorithms/models. For instance, in one example implementation, the electronic medical device program 202 can be or include an analytical program configured to monitor electrocardiogram (ECG) signals and the ML component 204 can comprise one or more machine learning models configured to interpret the ECG signals for analysis of arrhythmia detection.

Based on defined purchase and/or licensing agreements between the software provider of the electronic medical device program 202 and the respective healthcare institutions, the respective healthcare institutions can access and apply the electronic medical device program 202 for its intended purpose. The manner in which the program is accessed and applied by the respective healthcare institutes can vary. For example, in some implementations, the electronic medical device program 202 can be executed in individual medical acquisition devices (e.g., as part of the ECG equipment) used at the healthcare institutions, executed by a local/internal computing of the respective healthcare institutes that receives the input signals (e.g., the ECG signals), executed by a cloud based server that is accessed by all the healthcare instructions (e.g., as software as a service (SAAS)), or the like.

In accordance with the example shown in FIG. 2, the respective healthcare institutes can apply the same (cleared) electronic medical device program 202 on their patient population data as intended. The respective healthcare institutes can further communicate with the software provider device 108 to request and receive updates to the ML component 204, wherein the updates provided to each healthcare institute are customized based on their individual patient population data. For example, the distribution of the input data (e.g., patient ECG signals) processed by the ML component 204 for each healthcare institution can vary based on the demographic of the patients treated at the respective healthcare institutions. For instance, assume Healthcare Institute 1 is a children's hospital and Healthcare Institute 2 primarily treats elder patients. The input signals received for these different patient groups will likely vary and thus effect the specificity and accuracy of the ML component 204 output if the initial ML component 204 included with the electronic medical device program 202 was trained on more general data set representative of an equal distribution of patient age groups. Accordingly, it would be beneficial to tailor/fine-tune the sensitivity and accuracy of ML component 204 for each healthcare institute to the specific patient populations treated by the healthcare institutes to optimize performance based on their individual needs. However, under the existing model of medical device regulation, a machine learning algorithm (e.g., ML component 204) will be verified and validated, and then submitted for approval. Once approved, modifications to the algorithm generally require additional regulatory review and approval processes to ensure the safety and efficacy of the updated medical software product.

One or more embodiments of the disclosed subject matter provide techniques for enabling and managing these customized machine learning model updates that will ensure compliance with regulatory requirements that control the ML updates, maintain the security and privacy of the transaction to outside parties, and ensure traceability of transaction details in an immutable manner for quality and regulatory purposes. In this regard, with reference to system 200, in various embodiments, the healthcare institutes can submit requests (e.g., an update request 106) to the software provider device 108 for updates to the ML component 204. As discussed infra, the requests can include defined information that is needed to generate the custom model updates and ensure/validate compliance with the regulatory requirements for the updates. The model update transaction management component 110 can further receive the requests and can manage the generation and provision of the custom updates to the respective healthcare institutes while ensuring scientific integrity and traceability of the updates that meet the rigors of scientific, regulatory and/or manufacturer quality system scrutiny. In the embodiment shown, machine learning model updates (e.g., respectively shown as ML update 1, ML update 2, etc.) are associated with the respective healthcare institutions to indicate request and reception of an update to the ML component 204 by the respective healthcare institutions. The number of updates requested and received by each healthcare institution can vary. For example, the respective healthcare institutions can regularly request new updates over time.

With reference again to FIG. 1, in the embodiment shown, using the model update transaction component 104, the client device 102 can initiate a machine learning model update transaction by sending an update request 106 to the software provider device 108. The information included with the update request 106 can vary. In some embodiments, the update request 106 can include a data set that represents a distribution of local data associated with the client device system (e.g., patient ECG data from a specific healthcare institute) that requesting entity would like the updated machine learning model to be trained on (e.g., by the software provider device 108). With these embodiments, the software provider device 108 can employ the received data set to train and develop and updated version of the machine learning model.

Figure 3:
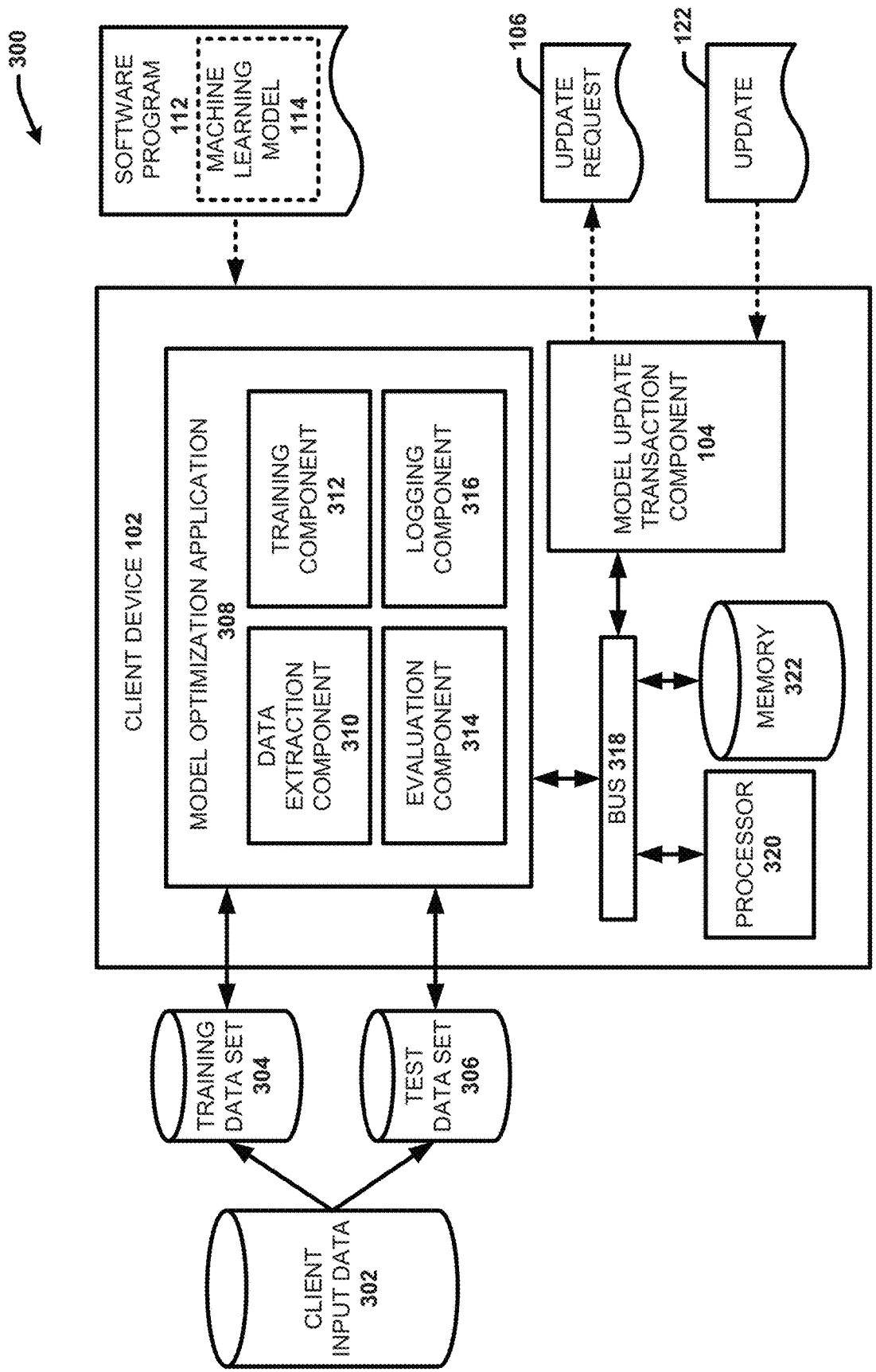
FIG. 3 illustrates a block diagram of an example, non-limiting system that facilitates requesting and receiving machine learning algorithm updates in accordance with one or more embodiments of the disclosed subject matter.

In one or more alternative embodiments, as described in greater detail infra with reference to FIG. 3, to facilitate generating the machine learning model updates, the client device 102 can employ a model optimization tool that allows the client device 102 to locally train and evaluate an instance of the machine learning model 114 based on local input data. With these embodiments, the update request 106 can include model development data used in association with the local training and development of the instance of the machine learning model by the client device 102. For example, the update request 106 can include the training data, the test data, the performance evaluation/validation data and the like. For instance, in implementations in which the machine learning model 114 is or is associated with a cleared medical product, to maintain and/or receive regulatory compliance for the update, information including scientific evidence supporting testing and validation is needed, including the training and test data, information logging how the training and test data was selected, information verifying the integrity of the data, and the like. Thus, in some embodiments, the update request 106 can include the input and output data used in association local training and evaluation of an instance of a machine learning model, including the training and test data, information logging how the training and test data was selected, and information verifying the integrity of the data.

The update request 106 can also include or be associated with compliance information that affirms or documents compliance with a regulatory policy that controls usage of the updated machine learning model. For example, the compliance information can affirm and/or document compliance with the regulatory policy in association with generation and utilization of the training data, the test data and the validation results. The update request 106 can also include information documenting legal acceptance of responsibility for the model development data provided with the request, documenting and/or affirming the model development data was generated in a scientifically sound way. In some implementations, the update request 106 can also include financial data that facilitates provision and/or authorization of payment for the requested update. Based on the nature of the data submitted with the update request, the data can be encrypted and/or anonymized (e.g., for personal patient record data and the like).

Based on reception of an update request 106, the software provider device 108 can employ the model update transaction management component 110 to manage fulfillment of the update request 106 using the blockchain system/network 116. For example, the model update transaction management component 110 can employ the blockchain system/network 116 to facilitate validating the transaction (e.g., which can include transfer of funds, licensing agreement review, regulatory compliance procedures, etc.), generating the updated version of the machine learning model, providing the updated version of the machine learning model to the client device 102, and recording/storing transaction information (e.g., the request, the training/test log files, validation records, etc.) in secure, encrypted and fully traceable manner back to the product release using blockchain.

Blockchain is a proven technology that delivers a secure, private and traceable ledger for transactions, used initially and primarily for financial transactions of cryptocurrency. A blockchain is a peer-to-peer, electronic ledger which is implemented as a computer-based decentralized, distributed system made up of blocks which in turn are made up of transactions. Each transaction is a data structure that encodes the transfer of control of a digital asset (e.g., a machine learning model update) between participants in the blockchain system and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. In order for a transaction to be written to the blockchain, it must be "validated." Network nodes (miners) perform work to ensure that each transaction is valid, with invalid transactions being rejected by the network. As used herein the term "blockchain" can include all forms of electronic, computer-based, distributed ledgers, including but not limited to, consensus-based blockchain and transaction-chain technologies, permissioned and un-permissioned ledgers, shared ledgers, dual ledgers, encrypted ledgers, side chains and alt chains, and variations thereof.

With this framework in mind, the blockchain system/network 116 can include one or more connected nodes (respectively identified as nodes $118_1$-node $118_n$,) that can perform various actions associated with validating and/or executing a transaction for a machine learning model update. For example, the one or more connected nodes $118_1$-node $118_n$ can include dedicated machines, systems, and/or computer executable component that perform various actions associated with the authorizing, validating, generating and documenting (e.g., using blockchain) the machine learning model update, including licensing agreement review, regulatory compliance review and approval, transfer of funds, authorization review, model update generation, model update distribution, and the like. The blockchain system/network 116 also includes a blockchain 120 that records transaction information for respective completed transactions of machine learning model updates. For example, the blockchain 120 can be or correspond to distributed ledger containing connected blocks, wherein each block represents a single transaction. In the embodiment shown, the respective blocks are labeled as transaction block (TB)-1, TB-2, TB-3 . . . TB-n and so on to indicate that each block represents a completed transaction. Although the blockchain 120 is shown as a separate "thing" from the nodes within the blockchain system/network, it should be appreciated that specific location where the blockchain 120 is stored can be distributed among the blockchain nodes ($118_1$-node $118_n$,) in accordance with blockchain technology standards. Further, although the software provider device 108 and the model update transaction management component 110 are shown as separate from the blockchain system/network 116, in various embodiments the software provider device 108 and/or the model update transaction management component 110 can be or correspond to a node in the blockchain system/network 116. For example, in various implementations, the software provider device 108 and/or the model update transaction management component 110 can be or correspond to a primary node or master node that controls and manages the blockchain system/network 116.

The blockchain system/network 116 provides a secure, encrypted, and tamper-proof method for handling a machine learning model transaction that maintains the security and privacy of the transaction to any outside parties. For example, the blockchain system/network 116 provides a secure, encrypted, and tamper-proof method for handling transfer of documentation of the technical training/test log files, validation records, etc., needed for scientific/regulatory quality control and approval while ensuring the security and privacy of this sensitive data. In addition, the blockchain system/network 116 provides a secure and protected mechanism for ensuring traceability of data, inputs, outputs, and transaction details that will guarantee integrity of information, and traceable information for quality and regulatory purposes.

In various embodiments, the client device 102, the software provider device 108, and/or the blockchain system/network 116 (e.g., the respective nodes 118, the blockchain 120, etc.) can be communicatively connected via one or more networks. Such networks can include wired and wireless networks, including but not limited to, a cellular network, a wide area network (WAD, e.g., the Internet) or a local area network (LAN). For example, the client device 102 can communicate with the software provider device 108, and/or the blockchain system/network 116, (and vice versa), using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols.

Although the client device 102 and the software provider device 108 are shown as separate, standalone devices, it should be appreciated that the client device 102 and/or the software provider device 108 can be or correspond to a system comprising two or more connected machines. In this regard, one or more components and/or functions of the client device 102 can be distributed across two or more communicatively coupled machines. Likewise, one or more components and/or functions of the software provider device 108 can be distributed across two or more communicatively coupled machines.

FIG. 3 illustrates a block diagram of an example, non-limiting system 300 that facilitates requesting and receiving machine learning algorithm updates in accordance with one or more embodiments of the disclosed subject matter. Repetitive description of like elements employed in respective embodiments is omitted for sake of brevity.

System 300 includes client device 102 and one or more database or datastores including client input data 302. In the embodiment shown, the client device 102 includes model optimization application 308 in addition to the model update transaction component 104. The client device 102 can include or be operatively coupled to at least one memory 322 and at least one processor 320. The at least one memory 322 can further store executable instructions (e.g., the model optimization application 308, the model update transaction component 104, and the like) that when executed by the at least one processor 320, facilitate performance of operations defined by the executable instructions. The client device 102 can further include a device bus 318 that communicatively couples the various components of the client device 102 (e.g., the model optimization application 308, the model update transaction component 104, the processor 320, and the memory 322). Examples of said processor 320 and memory 322, as well as other suitable computer or computing-based elements, can be found with reference to FIG. 14, and can be used in connection with implementing one or more of the systems or components shown and described in connection with FIG. 3 or other figures disclosed herein.

In one or more embodiments, the model optimization application 308 can provide an optimization tool that enables an entity that receives and/or applies a software program 112 (e.g., a healthcare institution receiving and applying a medical software product) to separately (in addition to employing the software product as intended) train an instance of the machine learning model 114. The purpose of this training process is to tailor the specificity and performance of the machine learning model 114 to the specific type of data the consuming entity that employs the software product (e.g., a younger patient population verses an older patient population). The model optimization application provides for training and tailoring an instance of the machine learning model 114 to the specific data of the consumer system in a controlled environment that is consistent with scientific and/or regulatory standards for the software product. The model optimization application further provides for evaluating the performance of the tailored model in accordance with the scientific and/or regulatory standards.

In some implementations, the model optimization application 308 can be provided with the software program 112 and configured to run an instance of the machine learning model 114 in a training mode. The model optimization application 308 can include data extraction component 310, training component 312, evaluation component 314 and logging component 316.

The data extraction component 310 can be configured to extract and/or receive local data of the consumer system that the original version of the machine learning model 114 is intended to process. For example, in implementations in the machine learning model 114 is configured evaluate ECG signals, the client input data 302 can include a historical set of ECG signals received for patients of a particular healthcare institution that uses the software program 112. The data extraction component 310 can further divide the client input data 302 data into a training data set 304 and a test data set 306. The training component 312 can further train and tune the instance of the machine learning model 114 based on the training data set. The model training can vary based on the type of the machine learning model (which can also vary). For example, the model training can include supervised learning, unsupervised learning, and/or semi-supervised learning techniques. In some implementations, the training component 312 can manage adjudication of annotations and machine learning characteristics. In association with the training, the training component 312 can adjust/adapt the instance of the machine learning model 114 (e.g., adjust one or more parameters and/or parameter weights of the model) to provide tailor the accuracy and specificity of the inferencing results based on the training data set 304. The evaluation component 314 can further apply the test data set 306 to the trained instance of the model in accordance with accepted scientific technical machine learning model development standards and regulations. The evaluation component 314 can further evaluate and/or facilitate evaluating the performance of the trained instance of the machine learning model based on the validation results generated in association with application of the trained instance of the model to the test data set 306. For example, the evaluation component 314 can provide an algorithm performance scoring and trending tool that facilitates reviewing and scoring the performance of the trained instance of the machine learning algorithm based on the validations results. In this regard, the evaluation component 314 can facilitate determining an accuracy/specificity score for the trained instance of the machine learning model that reflects the level of accuracy and specificity of the validation results.

The logging component 316 can log (e.g., store information in log files) information regarding the model optimization/training process in as secure and tamperproof manner. For example, the logging component 316 can log/store the training data set 304 and the test data set 306 in a manner that maintains the integrity of the respective data sets. The logging component 316 can also log the validation results and/or generate a logged summary of the validation results. In some implementations, the logging component 316 can anonymize the training and test data in association with storing/logging the training/test data (e.g., in implementations in which the training/test data includes personal identifiable information, such as patient names and the like). In some embodiments, the logging component 316 can further store the training data, the testing data and the validation results in a secure and encrypted manner. For example, in one implementation, the logging component 316 can encrypt the training data, the testing data and the validation results in accordance with a defined blockchain protocol employed by the model update transaction management component 110.

In some implementations, the model optimization application 308 can restrict access to the propriety structure, parameters and parameters weight/values, of the trained/tailored instance of the machine learning model 114. For example, the model optimization application 308 can operate in a learning mode that receives input data from the consumer system (e.g., the client input data 302, or the training data set 304, and the test data set 306), trains and tailors an instance of the machine learning model (e.g., adjusts parameters, parameter weights, etc.), and facilitates evaluating the performance of the tailored model. However, the specific structure of the model, the adjusted parameters/parameter weights, etc., can be kept inaccessible or otherwise invisible to the consumer system/entity. In this regard, the machine learning model itself can essentially be represented as "black box" to the consumer. The "black box" can receive input data (e.g., training and test data) and generates and output data (e.g., inferencing results), however, the interworking's of the model can remain inaccessible to the consuming entity (e.g., via encryption, access restriction, etc.). Thus, the model optimization application 308 can generate information that demonstrates the performance of the tailored instance of the machine learning model 114 but does not reveal or apply the changes to the model to generate an updated version of the model. This prevents the consumer from implementing unregulated and/or unauthorized updates to the machine learning model 114 of the software program 112.

In implementations in which the consumer system (e.g., the healthcare institutes) applies the model optimization application 308 to evaluate the performance of the locally trained instance of the machine learning model, if the performance is "good" than the consuming system can request an update (e.g., update request 106) from the software provider/managing entity for the software product that integrates the tailored/trained version of the model. For example, in some implementations, the model update transaction component 104 can evaluate the performance (e.g., measured in terms of accuracy and/or specificity) of the trained instance of the machine learning model 114 and determine whether the performance exceeds a defined performance level. If the performance exceeds the defined level of performance, the model update transaction component 104 can be configured to generate and send an update request 106 for an update to the machine learning model 114. In another implementation, the model update transaction component 104 can compare the performance of the trained instance of the machine learning model to the performance of the original (or previous) version of the machine learning model on the test data set 306. With this example, the model update transaction component 104 can determine whether an update is recommended based on whether the trained model performance exceeds the original model performance (e.g., in terms of accuracy and/or specificity) by a defined percentage. In this regard, in some implementations, the optimization tool can be configured to automatically generate and send an update request (e.g., update request 106) for an update to the machine learning model if the performance exceeds or meets a defined performance level/requirement. In other implementations, a user interfacing with the optimization tool can evaluate the performance results and request an update at the user's discretion.

In accordance with embodiments in which the client device 102 executes local model training and development using the model optimization application 308, the update request 106 can include the model optimization data logged by the logging component, including but not limited to, the training data set 304, the test data set 306, the validation results, and performance scoring/evaluation information regarding the accuracy and/or specificity of the trained instance of the machine learning model 114, and the like. In some implementations, the model optimization application 308 can also generate encrypted model adjustment information defining changes to model parameters/weighting and/or structure generated based on the local training process. (This is the data that cannot be viewed or accessed by consuming entity using the model optimization application 308). For example, this encrypted model adjustment data can be encrypted in a manner that enables only authorized entities (e.g., the software provider device 108 and/or the model update transaction management component 110) to decrypt and access/view the model adjustment data. The update request 106 can also include or otherwise be associated with appropriate authorization and/or regulatory information needed to perform the model update request transaction (e.g., financial payment data, licensing agreement data, regulatory compliance information, etc.). In other embodiments, rather than performing local model training and development, the client device 102 can provide the client input data 302 with an update request 106. With these embodiments, the software provider device 108 can perform and/or facilitate performance of model training and development based on the client input data 302 to generate the updated version of the machine learning model.

In various embodiments, the model update transaction component 104 can employ a defined blockchain protocol to generate and submit the update request 106. For example, the defined blockchain protocol can include a blockchain protocol used by the model update transaction management component 110 and/or the blockchain system/network 116 to manage fulfillment of the model update transaction request. For example, in some implementations, the model update transaction component 104 can encrypt the update request in accordance with the defined blockchain protocol. The model update transaction component 104 can similarly employ the defined blockchain protocol to receive an update 122 to the machine learning model. This mechanism for requesting and receiving updates to the machine learning models using blockchain technology facilitates the transfer of documentation of the technical training/test log files, validation records, etc., needed for scientific/regulatory compliance in a secure and traceable manner.

Figure 4:
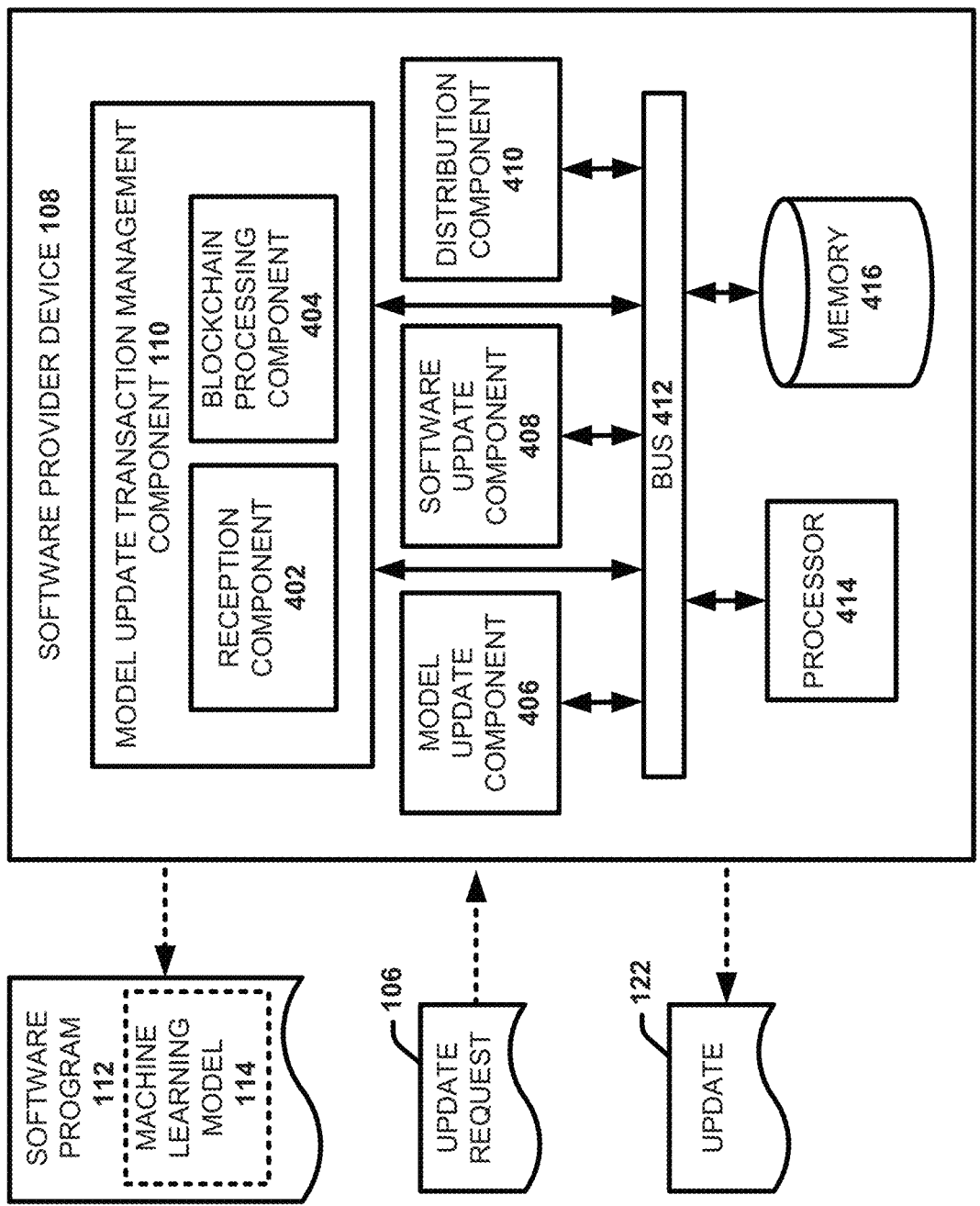
FIG. 4 illustrates a block diagram of an example, non-limiting software provider device that facilitates managing transactions of machine learning algorithm updates in accordance with one or more embodiments of the disclosed subject matter.

FIG. 4 illustrates a block diagram of an example, non-limiting, software provider device 108 that facilitates managing transactions of machine learning algorithm updates in accordance with one or more embodiments of the disclosed subject matter. Repetitive description of like elements employed in respective embodiments is omitted for sake of brevity.

In the embodiment shown, the software provider device 108 includes model update transaction management component 110, model update component 406, software update component 408 and distribution component 410. The software provider device 108 can include or be operatively coupled to at least one memory 416 and at least one processor 414. The at least one memory 416 can further store executable instructions (e.g., the model update transaction management component 110, the model update component 406, the software update component 408, the distribution component 410, and the like) that when executed by the at least one processor 414, facilitate performance of operations defined by the executable instructions. The software provider device 108 can further include a device bus 412 that communicatively couples the various components of the software provider device 108 (e.g., the model update transaction management component 110, the model update component 406, the software update component 408, the distribution component 410, the processor 414, and the memory 416). Examples of said processor 414 and memory 416, as well as other suitable computer or computing-based elements, can be found with reference to FIG. 14, and can be used in connection with implementing one or more of the systems or components shown and described in connection with FIG. 4 or other figures disclosed herein.

In the embodiment shown, the software provider device 108 can include model update transaction management component 110, which can include reception component 402 and blockchain processing component 404. The software provider device 108 can further include model update component 406, software update component 408 and distribution component 410.

The reception component 402 can be configured to receive an update request 106 requesting an update to a machine learning model, such as a machine learning model 114 included in a software program 112 provided by the software provider device 108. In various embodiments, the reception component 402 can receive the update request 106 in accordance with a defined blockchain protocol. As discussed above, in some embodiments, the update request 106 can include model development data used in association with optimization of an instance of the machine learning model (e.g., using model optimization application 308). For example, the model development data can include the training data used to training the instance of the machine learning model, the test data used to test the trained instance of the machine learning model, and the validation results data used to evaluate and/or document the performance accuracy and/or specificity of the trained version of the machine learning model. In other implementations, the update request 106 can include a set of client input data (e.g., client input data 302) that can be used by the software provider device 108 to train and develop a custom update to the machine learning model. In some embodiments, in which the machine learning model is controlled by a regulatory policy/agency (e.g., the FDA), the update request 106 can further comprise compliance information declaring that the model development data complies with the regulatory policy and/or documenting compliance with the regulatory policy in association with generation and utilization of the model development data. In some implementations, the update request 106 can also include financial information that authorizes and/or facilitates payment for the machine learning model update.

The model update transaction management component 110 can further include blockchain processing component 404 to facilitate managing fulfillment of the request using a blockchain system/network (e.g., blockchain system/network 116, and the like). For example, the blockchain processing component 404 can employ a blockchain system/ network to facilitate verifying the request can be fulfilled, facilitate generating an updated version of the machine learning model 114, facilitate distributing the updated version (e.g., update 122) of the machine learning model to the requesting entity, and the like. The blockchain processing component 404 can also employ the blockchain system/network (e.g., blockchain system/network 116, and the like) to record transaction information regarding the request and the fulfillment of the request using a blockchain data structure (e.g., blockchain 120) that is accessed using the blockchain network.

For example, similar to financial transactions, a transaction that involves the transfer of a digital asset such as machine learning model update (e.g., update 122) can require the transfer of funds (e.g., payment) for the digital asset as well as transfer of the digital asset itself (e.g., the update 122). Similar to the usage of blockchain technology to perform secure financial transactions, the blockchain processing component 404 can employ a blockchain system/network (e.g., blockchain system/network 116) to facilitate secure execution of a machine learning model update transaction. For example, the blockchain processing component 404 can employ a blockchain system/network 116 to verify and ensure the authenticity of the parties involved, to ensure the security of the information transferred, verify authorization for the transfer, verify the validity of the information transferred, and generate a distributed ledger (e.g., blockchain 120) to record historical transactions in a secure, encrypted and immutable data structure.

In addition, many machine learning model updates are regulated by one or more regulatory policies and/or agencies (e.g., the FDA and their associated regulatory policies governing medical software updates). These regulatory policies and/or agencies place additional transactional requirements on machine learning updates to ensure compliance with regulatory policies. The blockchain processing component 404 can further employ the blockchain system/network (e.g., blockchain system/network 116) to facilitate performance of these various additional transactional actions/steps associated with fulfilling a machine learning model update request online. For example, the blockchain processing component 404 can manage the distribution of approval and review actions across the blockchain system/network to ensure a requested machine learning model update can be fulfilled based in part on the information provided with the update request 106 (in accordance with one or more regulatory policies governing the machine learning model update). For example, using information provided with the update request 106 including compliance information affirming and/or documenting compliance with the regulatory requirements for the update, legal agreement information accepting responsibility for the update, training data, test data, log files, validation test summary data and the like, the blockchain processing component 404 can facilitate distribution of the data to the appropriate blockchain elements (e.g., nodes) that perform the checks and balances to ensure the model update request passes the regulatory checks and balances.

The blockchain processing component 404 can also employ the blockchain system/network to manage transactional checks and balances regarding licensing agreements (e.g., between the consumer and the entity providing the software update) and to ensure payment and/or authorization for the update prior to generation and provision of the update to the requesting entity. The blockchain processing component 404 can also mange recordation and maintenance of information documenting the model update transactions using a blockchain data structure (e.g., blockchain 120). For example, the blockchain processing component 404 can facilitate recording transaction information including the training data, the testing data, the validation results, the regulatory approval for the update, the actual model update and the like, in a secure and immutable blockchain. In this regard, through usage of a blockchain system/network to manage fulfillment of machine learning model update transactions, the blockchain processing component 404 can provide for managing all the following elements: 1) legal and financial transaction information between user and provider of the algorithm update, 2) data and performance integrity for training/test data sets and performance bench marking history, 3) final performance validation documentation using test data, 4) security and privacy for the transaction, and 5) archival of documentation and traceability artifacts required for regulatory and scientific rigor.

The software provider device 108 can further include model update component 406 to generate the requested update to a machine learning model 114. For example, in some embodiments, the model update component 406 can employ the model optimization data provided with an update request 106 to generate an updated version of the machine learning model. For instance, in some implementations, the model update component 406 can employ the training data set and the test data provided with the update request 106 to re-perform the model training and development procedure and evaluate the validity of the validation results. The model update component 406 can further generate the updated version of the machine learning model 114 based on the validation results meeting the performance level requirement set for and/or identified for the trained instance of the machine learning model observed by the model optimization application 308. For example, the model update component 406 can adjust the original model parameters and/or parameter weights in accordance with the trained instance of the machine learning model, thereby generating an updated version of the machine learning model. In this regard, the model update component 406 can audit the model development and training procedure performed using the model optimization application to verify the results and duplicate training and development to generate the corresponding trained/updated version of the machine learning model based on a determination that the results are accurate.

In some implementations, the blockchain processing component 404 can employ the blockchain system to determine whether the update 122 is validated, and the model update component 406 can generate the updated version of the machine learning model based on a determination that the update is validated. In this regard, prior to generating the updated version of the model, the blockchain processing component 404 can employ the blockchain system/network to validate the model update transaction. In other embodiments, the model update component 406 can generate the updated version of the machine learning model in association with validating the transaction using the blockchain system/network. With these embodiments, the blockchain processing component 404 can employ the blockchain system/network to ensure the updated version of the machine learning model is validated prior to completing the transaction.

In some embodiments, in association with generating the updated version of the machine learning model, the software update component 408 can be configured to generate update data (e.g., update 122) for incorporating the updated version of the machine learning model into the software program (e.g., software program 112). The software provider device 108 can further include distribution component 410 to provide the update data (e.g., update 122) to an authorized entity associated with the request, resulting in the fulfillment of the update request 106. Based on fulfillment of the update request, transaction information regarding the update request 106 and the fulfillment of the request can be recorded in a blockchain data structure (e.g., blockchain 120) accessed via the blockchain system/network. In this regard, by using blockchain to facilitate and manage the machine learning model update transaction, information identifying the parties involved in the transaction, the timing of the transaction, the data submitted and/or generated in association with the transaction (e.g., the training/test log files, the validation records, the regulatory compliance information, the actual model update, etc.), the funds transferred, the licensing agreement associated with the transaction, etc. can be stored in a secure, encrypted and fully traceable manner back to the product release.

Figure 5:
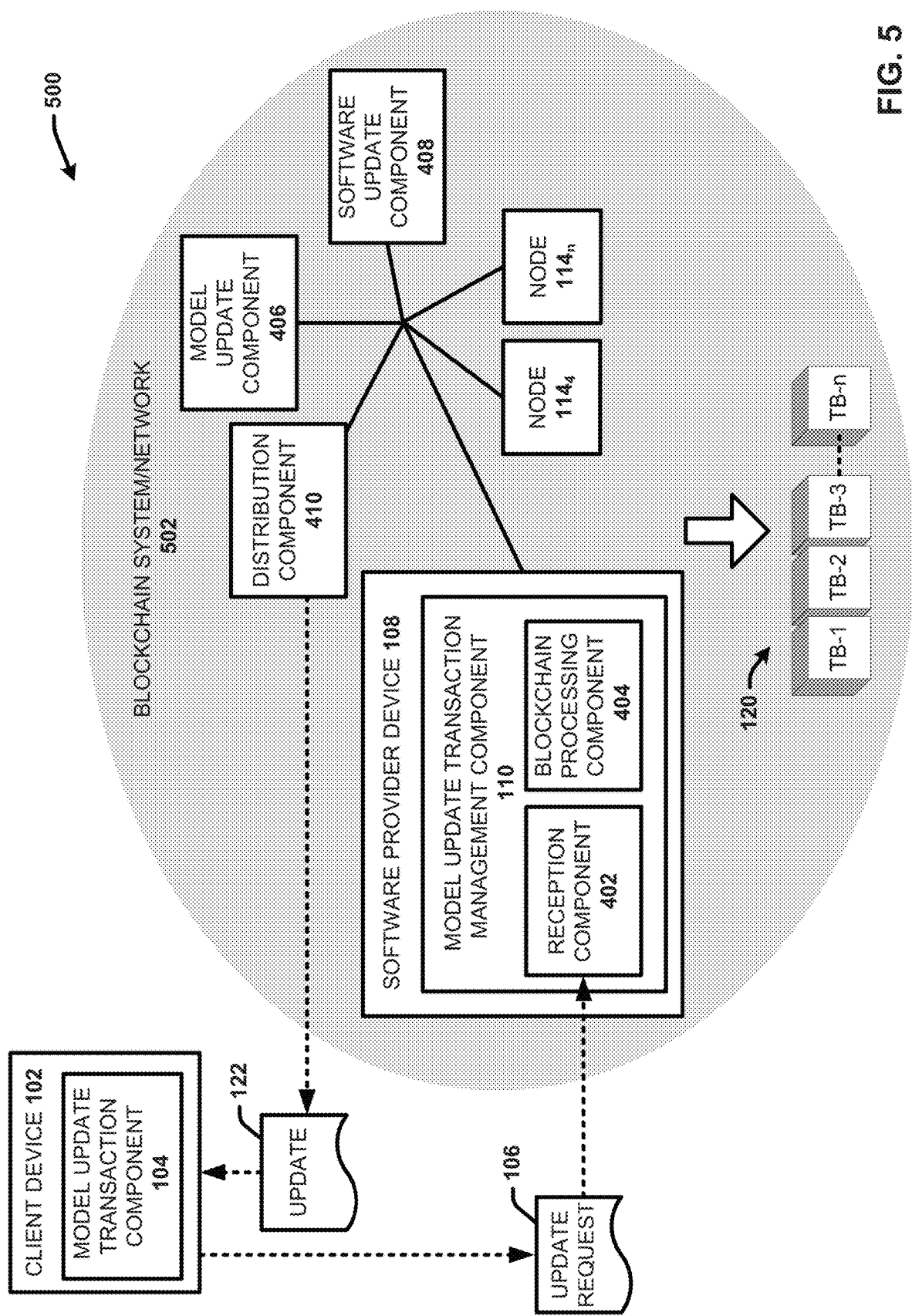
FIG. 5 illustrates a block diagram of another example, non-limiting system that facilitates managing transactions of machine learning algorithm updates in accordance with one or more embodiments of the disclosed subject matter.

FIG. 5 illustrates a block diagram of another example, non-limiting system 500 that facilitates managing transactions of machine learning algorithm updates in accordance with one or more embodiments of the disclosed subject matter. System 500 includes same or similar features and functionalities as system 100 yet provides another example architecture for implementing the blockchain system/network to facilitate machine learning model update transactions. Repetitive description of like elements employed in respective embodiments is omitted for sake of brevity.

In the embodiment shown, the blockchain system/network 502 include the software provider device 108. The software provider device 108 can include the model update transaction management component 110, while the distribution component 410 the model update component 406 and the software update component 408 can be distributed within the blockchain system/network at separate nodes. In accordance with system 500, the software provider device can receive an update request 106 and employ the blockchain system/network 502 to perform the necessary actions to verify, fulfill and record transaction information for the model update using the blockchain 120. For example, using the blockchain processing component 404, the software provider device 108 can manage transaction steps/actions associated with validating the update, authorizing the update, ensuring regulatory compliance for the update, facilitating payment for the update, generating the update 122, distributing the update, and the like. These various transactions steps/actions can be performed by the software provider device 108 and/or distributed amongst different nodes in the blockchain system/network 502.

Figure 6:
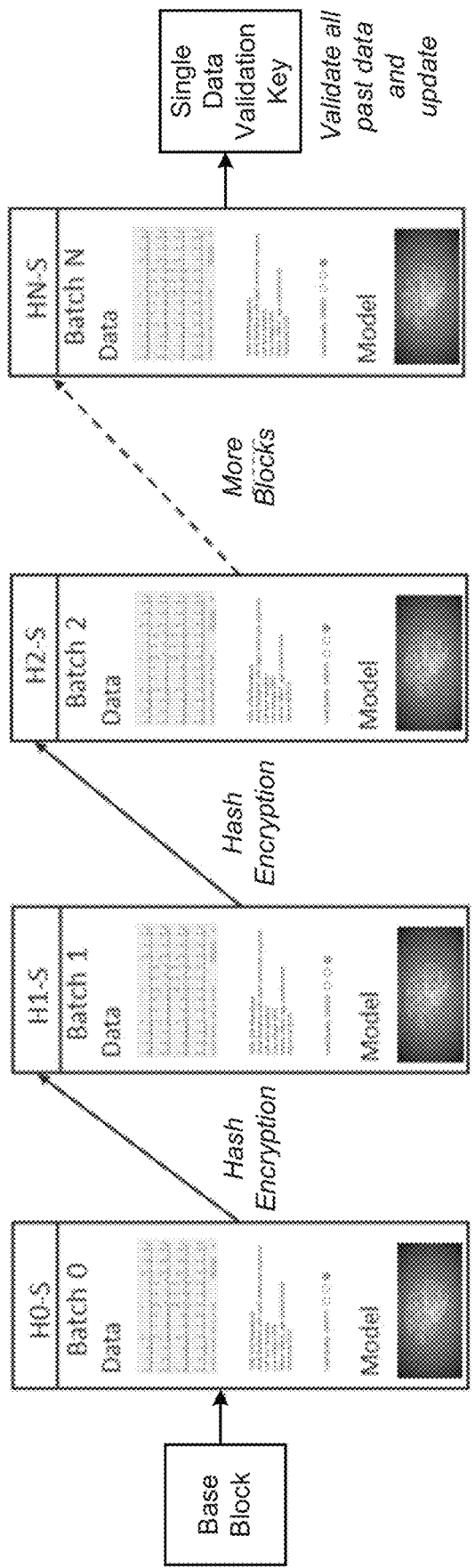
FIGS. 6-8 illustrates an example blockchain data structures that facilitates storing transaction information regarding machine learning algorithm update transactions in accordance with one or more embodiments of the disclosed subject matter.
Figure 7:
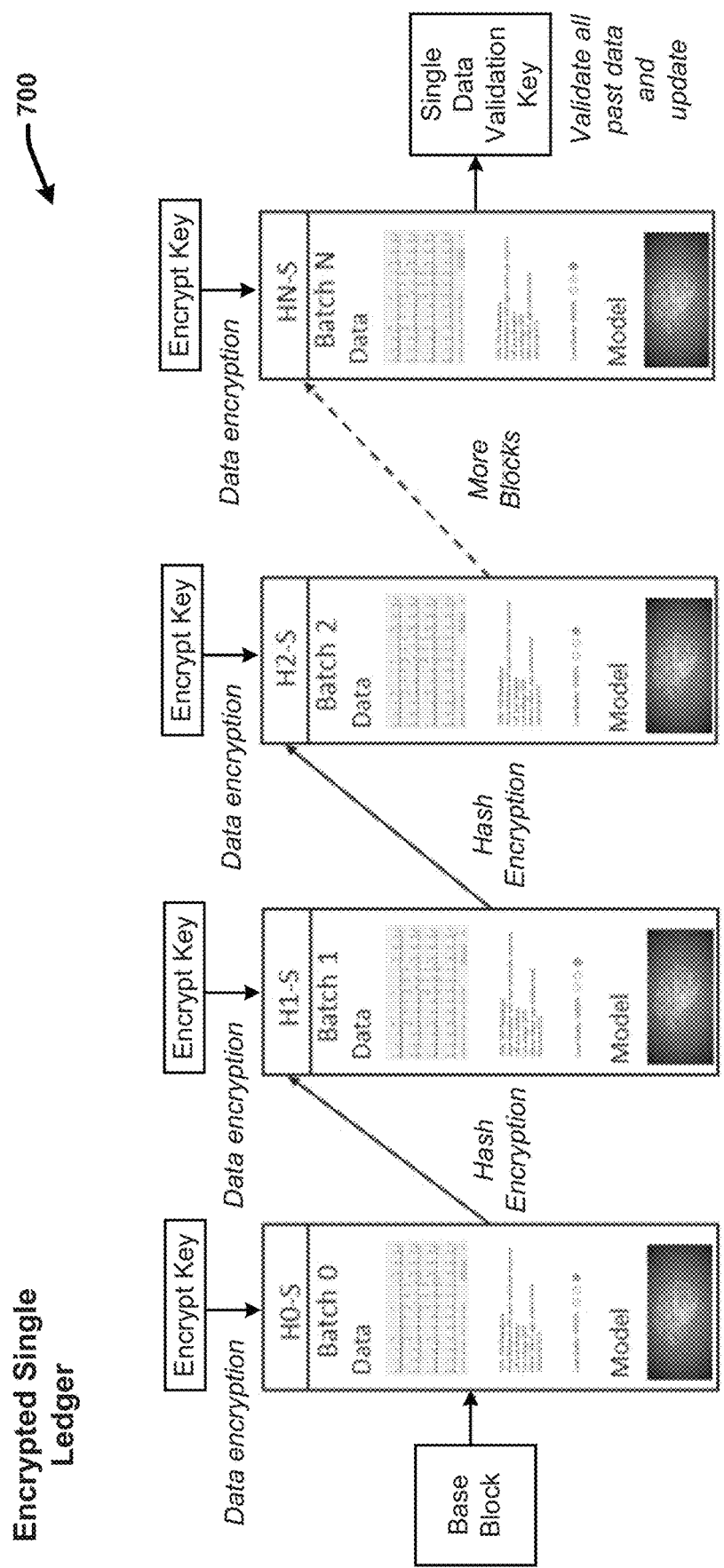
Figure 8:
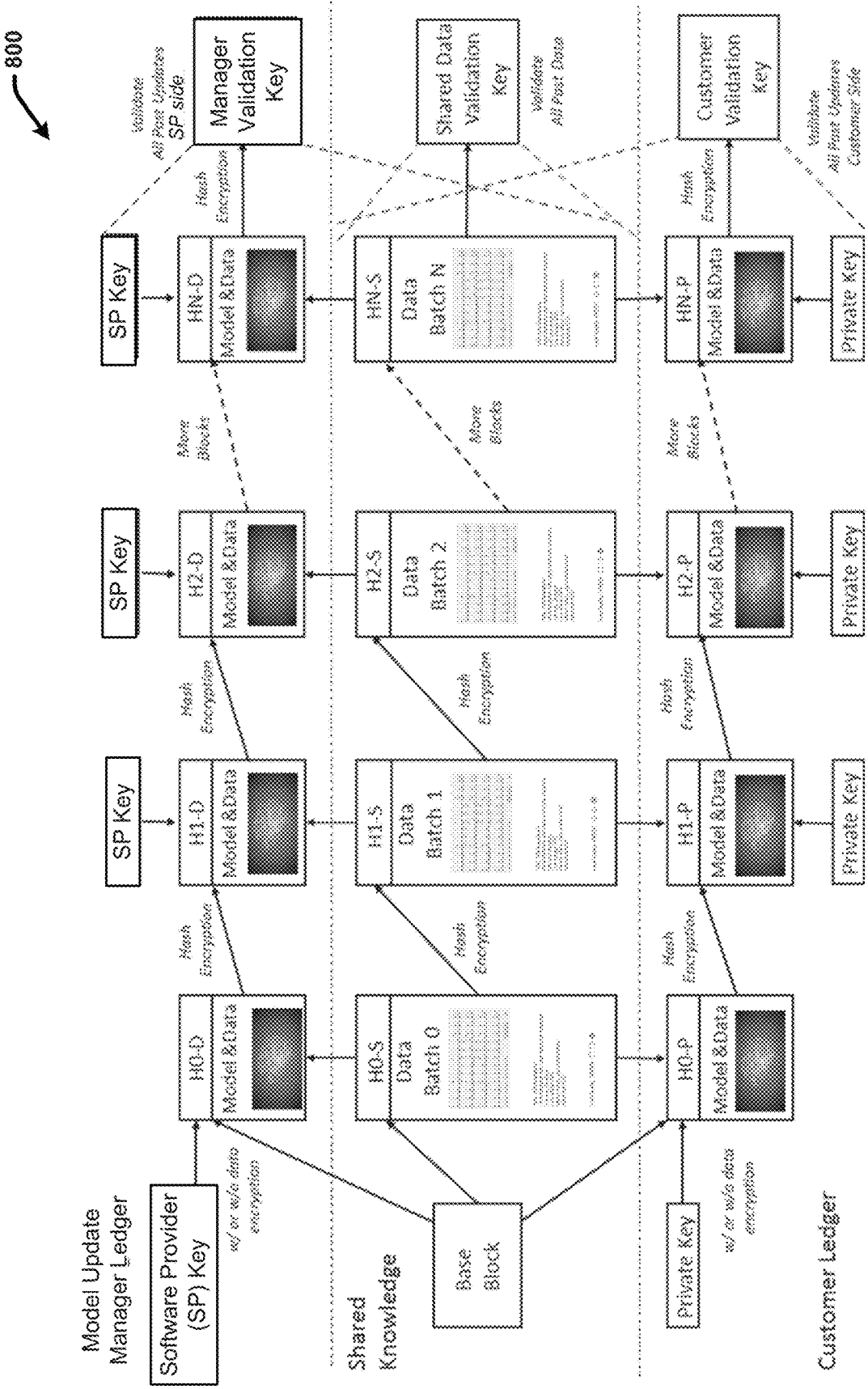

FIGS. 6-8 illustrates example blockchain data structure that can be used to facilitates storing transaction information regarding machine learning algorithm update transactions in accordance with one or more embodiments of the disclosed subject matter. In this regard, the blockchain 120 included in system 100 and system 500 can be or include one or more of the blockchain data structures shown in FIGS. 6-8. In this regard, FIG. 6 presents a single ledger blockchain data structure 600, FIG. 7 presents an encrypted single ledger blockchain data structure 700, and FIG. 8 presents an encrypted dual ledger blockchain data structure 800.

With reference to FIG. 6 the single ledger blockchain data structure 600 can include all possible information and data related to the transaction activity (e.g., the request and provision of a machine learning algorithm update in accordance with a defined financial/licensing agreement). For example, in implementation in which the machine learning algorithm update involves an updated to an ECG algorithm, the blockchain can include the training, test and validation ECG data provided with the request, information regarding the parties involved in the transaction, transaction time/date information, information regarding affirmation of compliance with regulatory requirements for data collection, training and testing, and the like. The encrypted single ledger blockchain data structure 700 shown in FIG. 7 can include same or similar features and functionalities as the single ledger blockchain data structure 600 with the addition of an additional encryption layer or other cybersecurity measurement.

FIG. 8 presents an encrypted dual ledger blockchain data structure 800. The encrypted dual ledger blockchain data structure 800 include multiple independently encrypted blockchains that share commonly known information regarding the transaction with separate keys and encrypted contents. These blockchain ledgers independently encrypt and verify the activity to be cryptically protected.

Figure 9:
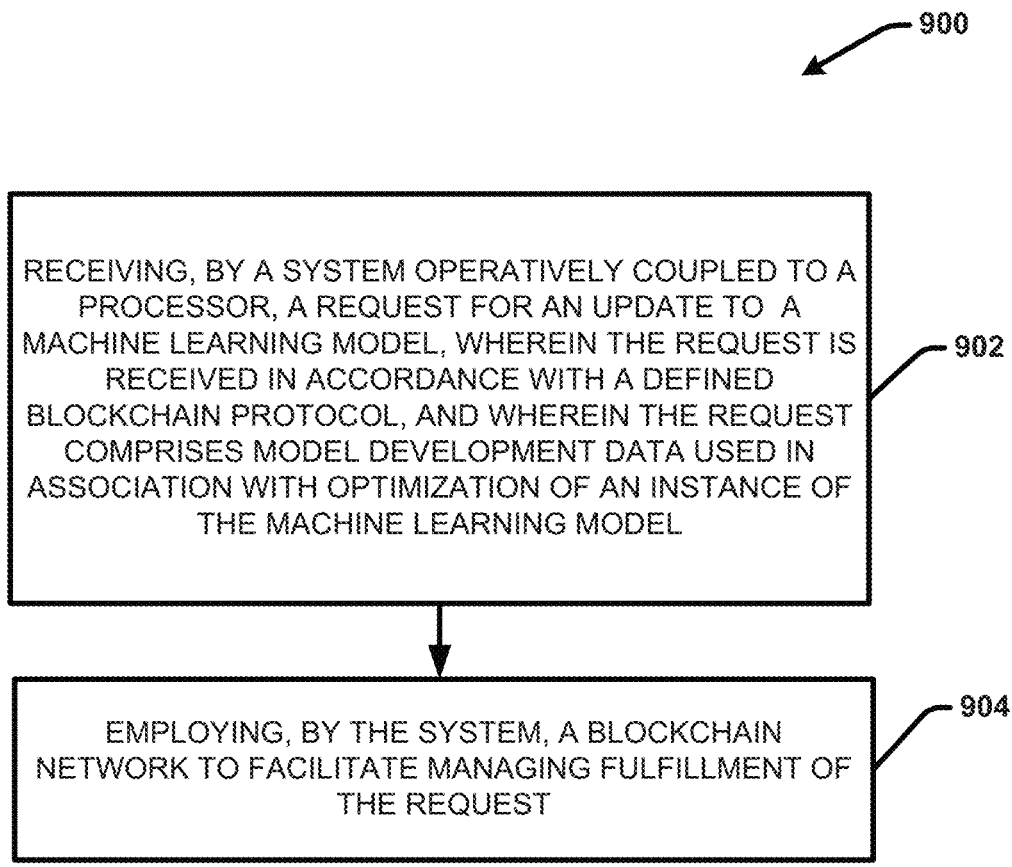
FIG. 9 illustrates an example, high level flow diagram of a computer-implemented process for managing transactions of machine learning algorithm updates in accordance with one or more embodiments of the disclosed subject matter.

FIG. 9 illustrates an example, high level flow diagram of a computer-implemented process 900 for managing transactions of machine learning algorithm updates in accordance with one or more embodiments of the disclosed subject matter. Repetitive description of like elements employed in respective embodiments is omitted for sake of brevity.

At 902, a system operatively coupled to a processor (e.g., system 100, software provider device 108, blockchain system/network 116, system 500, blockchain system/network 502, and the like), receives a request for an update to a machine learning model (e.g., via reception component 402), wherein the request is received in accordance with a defined blockchain protocol, and wherein the request comprises model development data used in association with optimization of an instance of the machine learning model. At 904, the system employs a blockchain network (e.g., blockchain system/network 116, blockchain system/network 502, or the like) to facilitate managing fulfillment of the request (e.g., using model update transaction management component 110 and/or blockchain processing component 404).

Figure 10:
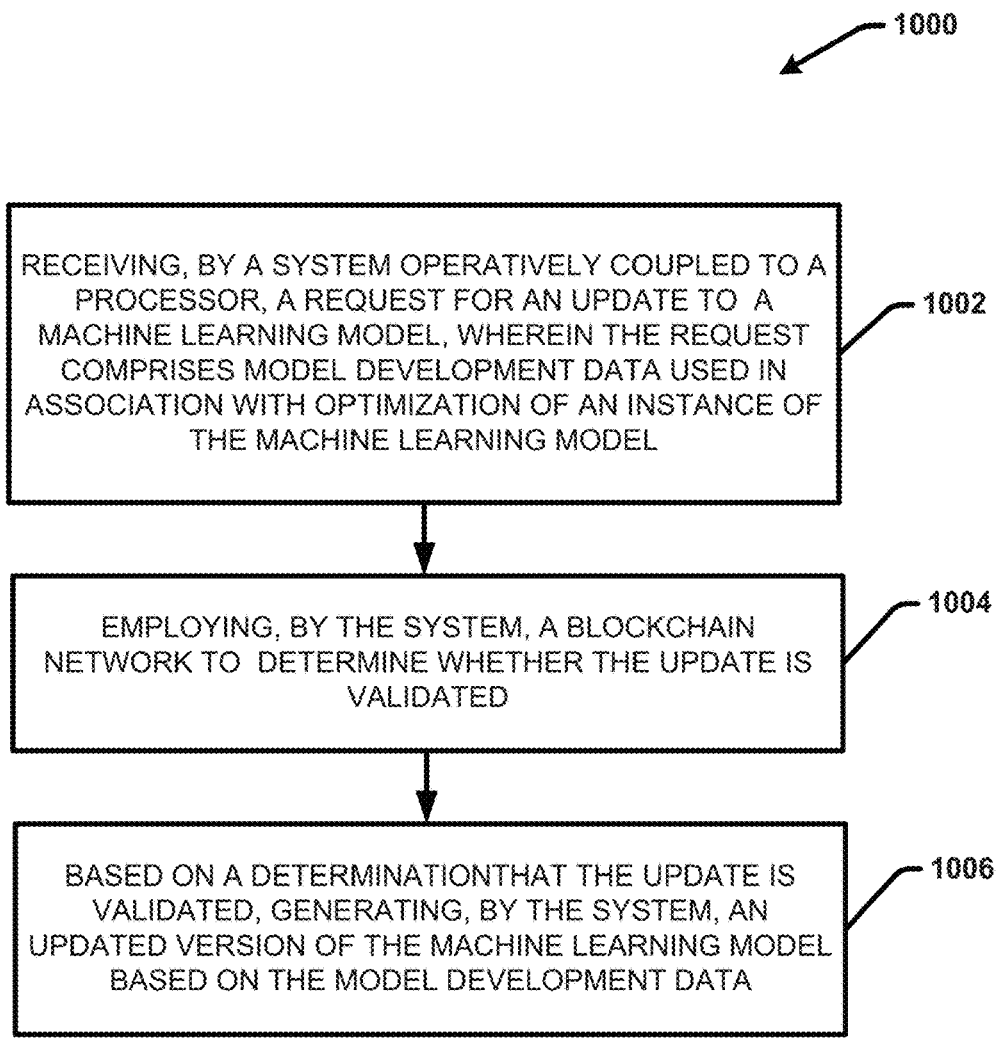
FIG. 10 illustrates another example, high level flow diagram of a computer-implemented process for managing transactions of machine learning algorithm updates in accordance with one or more embodiments of the disclosed subject matter.

FIG. 10 illustrates another example, high level flow diagram of a computer-implemented process 1000 for managing transactions of machine learning algorithm updates in accordance with one or more embodiments of the disclosed subject matter. Repetitive description of like elements employed in respective embodiments is omitted for sake of brevity.

At 1002, a system operatively coupled to a processor (e.g., system 100, software provider device 108, blockchain system/network 116, system 500, blockchain system/network 502, and the like), receives a request for an update to a machine learning model (e.g., via reception component 402), wherein the request comprises model development data used in association with optimization of an instance of the machine learning model. At 1004, the system employs a blockchain network (e.g., blockchain system/network 116, blockchain system/network 502, or the like) to determine whether the update is validated (e.g., using model update transaction management component 110 and/or blockchain processing component 404). At 1006, based on a determination that the update is validated, the system generates an updated version of the machine learning model based on the model development data (e.g., using model update component 406).

Figure 11:
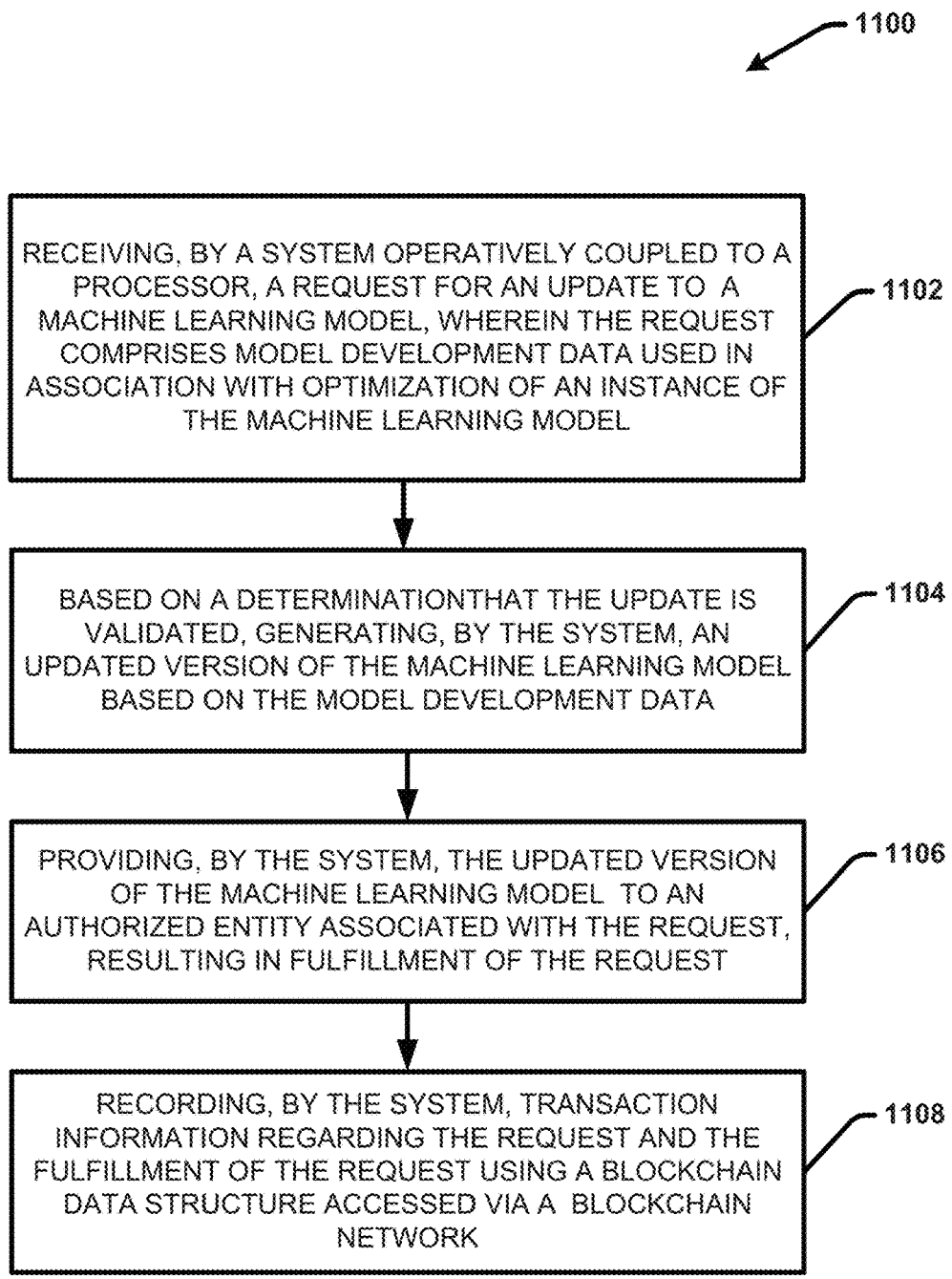
FIG. 11 illustrates another example, high level flow diagram of a computer-implemented process for managing transactions of machine learning algorithm updates in accordance with one or more embodiments of the disclosed subject matter.

FIG. 11 illustrates another example, high level flow diagram of a computer-implemented process 1100 for managing transactions of machine learning algorithm updates in accordance with one or more embodiments of the disclosed subject matter. Repetitive description of like elements employed in respective embodiments is omitted for sake of brevity.

At 1102, a system operatively coupled to a processor (e.g., system 100, software provider device 108, blockchain system/network 116, system 500, blockchain system/network 502, and the like), receives a request for an update to a machine learning model (e.g., via reception component 402), wherein the request comprises model development data used in association with optimization of an instance of the machine learning model. At 1104, based on a determination that the update is validated, the system generates an updated version of the machine learning model based on the model development data (e.g., using model update component 406). At 1106, the system provides the updated version of the machine learning model to an entity associated with the request (e.g., client device 102), resulting in fulfillment of the request (e.g., using distribution component 410). At 1108, the records transaction information regarding the request and the fulfillment of the request using a blockchain data structure (e.g., blockchain 120) accessed via a blockchain network (e.g., blockchain system/network 116 and/or blockchain system/network 502).

Figure 12:
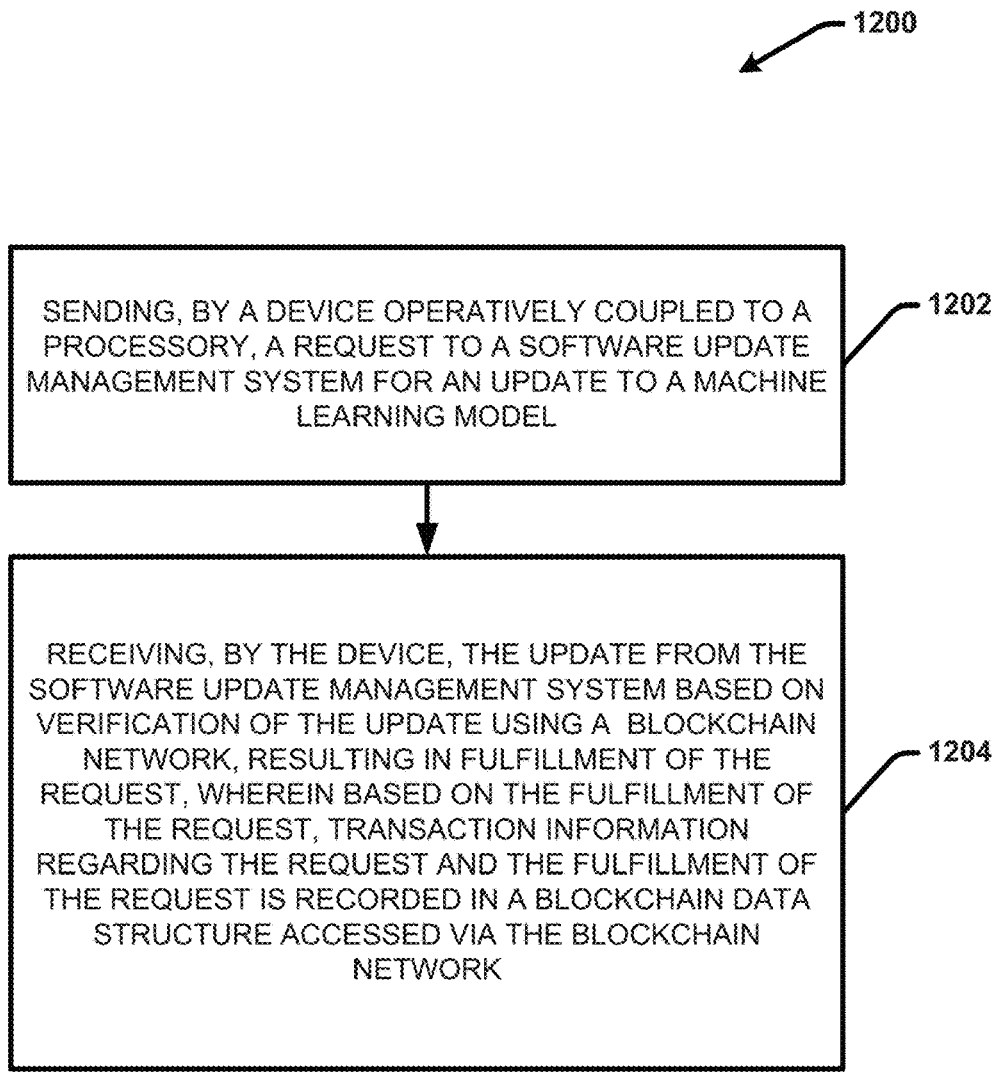
FIG. 12 illustrates an example, high level flow diagram of a computer-implemented process for requesting and receiving machine learning algorithm updates in accordance with one or more embodiments of the disclosed subject matter.

FIG. 12 illustrates an example, high level flow diagram of a computer-implemented process 1200 for requesting and receiving machine learning algorithm updates in accordance with one or more embodiments of the disclosed subject matter. Repetitive description of like elements employed in respective embodiments is omitted for sake of brevity.

At 1202, a device operatively coupled to a processor (e.g., client device 102) can send a request to a software update management system (e.g., software provider device 108, blockchain system/network 116 and/or blockchain system/network 502) for an update to a machine learning model. At 1202, the device can receive the update from the software update management system based on verification of the update using a blockchain network, resulting in fulfillment of the request, wherein based on the fulfillment of the request, transaction information regarding the request and the fulfillment of the request is recorded in a blockchain data structure accessed via the blockchain network.

Figure 13:
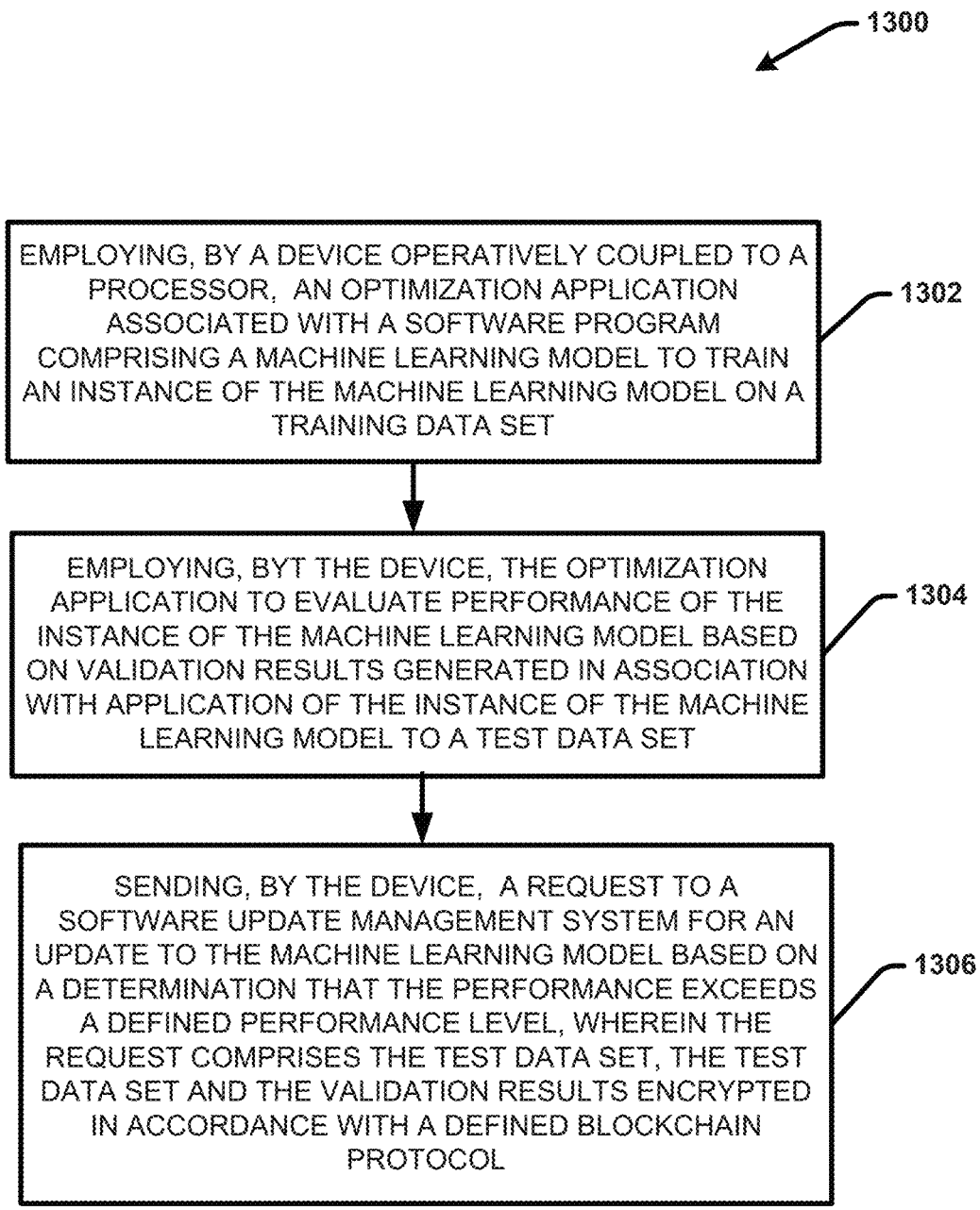
FIG. 13 illustrates an example, high level flow diagram of a computer-implemented process for requesting machine learning algorithm updates in accordance with one or more embodiments of the disclosed subject matter.

FIG. 13 illustrates an example, high level flow diagram of a computer-implemented process 1300 for requesting machine learning algorithm updates in accordance with one or more embodiments of the disclosed subject matter. Repetitive description of like elements employed in respective embodiments is omitted for sake of brevity.

At 1302, a device operatively coupled to a processor (e.g., client device 102) can employ an optimization application (model optimization application 308) associated with a software program comprising a machine learning model to train an instance of the machine learning model on a training data set (e.g., using training component 312). At 1304, the device can employ the optimization application to evaluate performance of the instance of the machine learning model based on validation results generated in association with application of the instance of the machine learning model to a test data set (e.g., using evaluation component 314). At 1306, the device can a request (e.g., using model update transaction component 104) to a software update management system (e.g., software provider device 108, blockchain system/network 116 and/or blockchain system/network 502) for an update to the machine learning model based on a determination that the performance exceeds a defined performance level, wherein the request comprises the training data set, the test data set, and the validation results encrypted in accordance with a defined blockchain protocol.

One or more embodiments can be a system, a method, and/or a computer program product at any possible technical detail level of integration. The computer program product can include a computer readable storage medium (or media) having computer readable program instructions thereon for causing a processor to carry out one or more aspects of the present embodiments.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the entity's computer, partly on the entity's computer, as a stand-alone software package, partly on the entity's computer and partly on a remote computer or entirely on the remote computer or server. In the latter scenario, the remote computer can be connected to the entity's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 14, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 14:
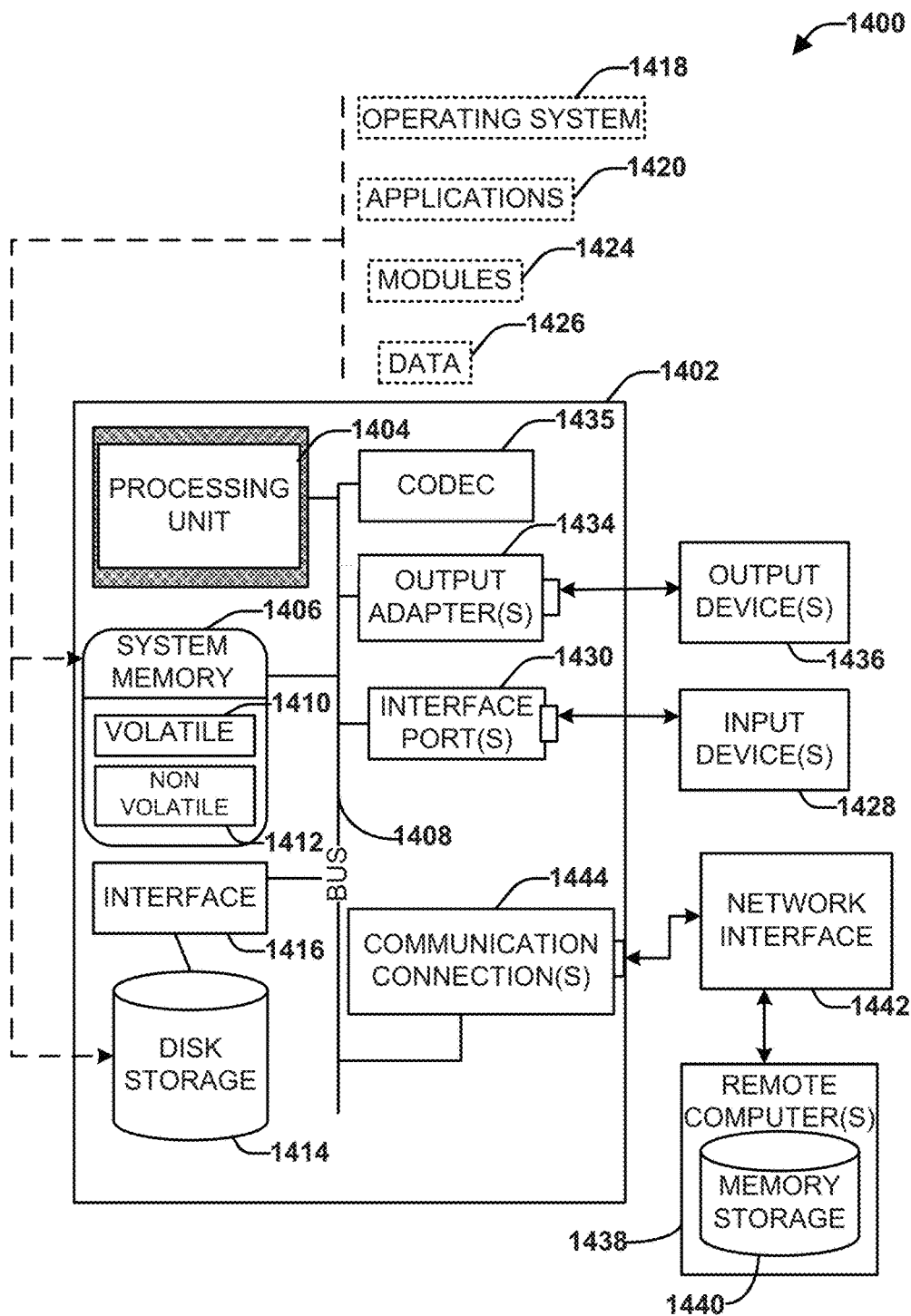
FIG. 14 illustrates a block diagram of an example, non-limiting operating environment in which one or more embodiments described herein can be facilitated.

With reference to FIG. 14, an example environment 1400 for implementing various aspects of the claimed subject matter includes a computer 1402. The computer 1402 includes a processing unit 1404, a system memory 1406, a codec 1435, and a system bus 1408. The system bus 1408 couples system components including, but not limited to, the system memory 1406 to the processing unit 1404. The processing unit 1404 can be any of various available processors. Dual microprocessors and other multiprocessor architectures also can be employed as the processing unit 1404.

The system bus 1408 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 13144), and Small Computer Systems Interface (SCSI).

The system memory 1406 includes volatile memory 1410 and non-volatile memory 1412, which can employ one or more of the disclosed memory architectures, in various embodiments. The basic input/output system (BIOS), containing the basic routines to transfer information between elements within the computer 1402, such as during start-up, is stored in non-volatile memory 1412. In addition, according to present innovations, codec 1435 can include at least one of an encoder or decoder, wherein the at least one of an encoder or decoder can consist of hardware, software, or a combination of hardware and software. Although, codec 1435 is depicted as a separate component, codec 1435 can be contained within non-volatile memory 1412. By way of illustration, and not limitation, non-volatile memory 1412 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1412 can employ one or more of the disclosed memory devices, in at least some embodiments. Moreover, non-volatile memory 1412 can be computer memory (e.g., physically integrated with computer 1402 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1410 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1402 can also include removable/non-removable, volatile/non-volatile computer storage medium. FIG. 14 illustrates, for example, disk storage 1414. Disk storage 1414 includes, but is not limited to, devices like a magnetic disk drive, solid state disk (SSD), flash memory card, or memory stick. In addition, disk storage 1414 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1414 to the system bus 1408, a removable or non-removable interface is typically used, such as interface 1416. It is appreciated that disk storage 1414 can store information related to an entity. Such information might be stored at or provided to a server or to an application running on an entity device. In one embodiment, the entity can be notified (e.g., by way of output device(s) 1436) of the types of information that are stored to disk storage 1414 or transmitted to the server or application. The entity can be provided the opportunity to opt-in or opt-out of having such information collected or shared with the server or application (e.g., by way of input from input device(s) 1428).

It is to be appreciated that FIG. 14 describes software that acts as an intermediary between entities and the basic computer resources described in the suitable operating environment 1400. Such software includes an operating system 1418. Operating system 1418, which can be stored on disk storage 1414, acts to control and allocate resources of the computer system 1402. Applications 1420 take advantage of the management of resources by operating system 1418 through program modules 1424, and program data 1426, such as the boot/shutdown transaction table and the like, stored either in system memory 1406 or on disk storage 1414. It is to be appreciated that the claimed subject matter can be implemented with various operating systems or combinations of operating systems.

An entity enters commands or information into the computer 1402 through input device(s) 1428. Input devices 1428 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1404 through the system bus 1408 via interface port(s) 1430. Interface port(s) 1430 include, for example, a serial port, a parallel port, a game port, and a universal serial bus (USB). Output device(s) 1436 use some of the same type of ports as input device(s) 1428. Thus, for example, a USB port can be used to provide input to computer 1402 and to output information from computer 1402 to an output device 1436. Output adapter 1434 is provided to illustrate that there are some output devices 1436 like monitors, speakers, and printers, among other output devices 1436, which require special adapters. The output adapters 1434 include, by way of illustration and not limitation, video and sound cards that provide a means of connection between the output device 1436 and the system bus 1408. It should be noted that other devices or systems of devices provide both input and output capabilities such as remote computer(s) 1438.

Computer 1402 can operate in a networked environment using logical connections to one or more remote computers, such as remote computer(s) 1438. The remote computer(s) 1438 can be a personal computer, a server, a router, a network PC, a workstation, a microprocessor based appliance, a peer device, a smart phone, a tablet, or other network node, and typically includes many of the elements described relative to computer 1402. For purposes of brevity, only a memory storage device 1440 is illustrated with remote computer(s) 1438. Remote computer(s) 1438 is logically connected to computer 1402 through a network interface 1442 and then connected via communication connection(s) 1444. Network interface 1442 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1444 refers to the hardware/software employed to connect the network interface 1442 to the system bus 1408. While communication connection 1444 is shown for illustrative clarity inside computer 1402, it can also be external to computer 1402. The hardware/software necessary for connection to the network interface 1442 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of entity equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device, comprising:
   a memory that stores computer executable components; and
   a processor that executes the computer executable components stored in the memory, wherein the computer executable components comprise:
   a reception component that receives, from a first device, a request for an update to a machine learning model associated with a software program, wherein the request is received in accordance with a defined blockchain protocol, and wherein the request comprises model development data used in association with optimization of an instance of the machine learning model;
   a transaction management component that employs a blockchain system to facilitate managing fulfillment of the request which comprises determining whether the update is validated;
   a model update component that generates an updated version of the machine learning model based on the model development data in response to a determination that the update is validated; and
   a distribution component that sends the updated version of the machine learning model to the first device in response to the updated version of the machine learning model being validated.

2. The device of claim 1, wherein the computer executable components further comprise:
a software update component that generates update data for incorporating the updated version of the machine learning model into the software program.

3. The device of claim 1, wherein the transaction management component employs the blockchain system to record transaction information regarding the request and the fulfillment of the request using a blockchain data structure.

4. The device of claim 1, wherein the model development data comprises training data used to train the instance of the machine learning model, test data used to test the instance of the machine learning model, and validation results data generated based on application of the test data to the instance of the machine learning model.

5. The device of claim 4, wherein the software program comprises an optimization component that trains the instance of the machine learning model based on the training data and evaluates performance of the instance of the machine learning model based on the test data, resulting in the validation results data.

6. The device of claim 5, wherein the optimization component prevents access to model information defining a structure, parameters, and parameter weights of the instance of the machine learning model.

7. The device of claim 5, wherein the reception component receives the request based on the validation results data indicating the performance of the instance of the machine learning model exceeds a defined performance level.

8. The device of claim 4, wherein updates to the software program are controlled by a regulatory policy and wherein the request further comprises compliance information declaring that the model development data complies with the regulatory policy.

9. The device of claim 4, wherein updates to the software program are controlled by a regulatory policy and wherein the request further comprises compliance information that documents compliance with the regulatory policy in association with generation and utilization of the model development data.

10. The device of claim 9, wherein the software program comprises a medical device product.

11. A method, comprising:
receiving, by a system operatively coupled to a processor, a request for an update to a machine learning model, wherein the request is received in accordance with a defined blockchain protocol, and wherein the request comprises model development data used in association with optimization of an instance of the machine learning model;
employing, by the system, a blockchain network to facilitate managing fulfillment of the request,
wherein the model development data comprises training data used to train the instance of the machine learning model, test data used to test the instance of the machine learning model, and validation results data generated based on application of the test data to the instance of the machine learning model,
wherein the software program comprises an optimization component that trains the instance of the machine learning model based on the training data and evaluates performance of the instance of the machine learning model based on the test data, resulting in the validation results data, and
wherein the optimization component prevents access to model information defining a structure, parameters, and parameter weights of the instance of the machine learning model.

12. The method of claim 11, further comprising:
generating, by the system, an updated version of the machine learning model based on the model development data.

13. The method of claim 12, further comprising:
employing, by the system, the blockchain network to determine whether the update is validated, wherein the generating the updated version of the machine learning model based on a determination that the update is validated.

14. The method of claim 13, further comprising:
generating, by the system, update data for incorporating the updated version of the machine learning model into a software program that employs the machine learning model; and
providing, by the system, the update data to an authorized entity associated with the request, resulting in the fulfillment of the request.

15. The method of claim 11, further comprising:
recording, by the system, transaction information regarding the request and the fulfillment of the request using a blockchain data structure accessed via the blockchain network.

16. The method of claim 11, wherein updates to the software program are controlled by a regulatory policy and wherein the request further comprises compliance information that affirms or documents compliance with the regulatory policy in association with generation and utilization of the model development data.

17. The method of claim 16, wherein the software program comprises a medical device product.

18. A non-transitory machine-readable storage medium, comprising executable instructions that, when executed by a processor, facilitate performance of operations, comprising:
sending a request to a software provider device for an update to a machine learning model;
receiving the update from the software provider device based on verification of the update using a blockchain network, resulting in fulfillment of the request, wherein based on the fulfillment of the request, transaction information regarding the request and the fulfillment of the request is recorded in a blockchain data structure accessed via the blockchain network;
wherein the operations further comprise: employing an optimization application associated with a software program comprising the machine learning model to train an instance of the machine learning model on a training data set; and employing the optimization application to evaluate performance of the instance of the machine learning model based on validation results generated in association with application of the instance of the machine learning model to a test data set;
wherein the sending the request is based on a determination that the performance exceeds a defined performance level.

19. The non-transitory machine-readable storage medium of claim 18, wherein the software provider device employs the blockchain network and an associated blockchain protocol to facilitate reception and fulfillment of the request.

20. The non-transitory machine-readable storage medium of claim 18, wherein the sending the request comprises encrypting the request in accordance with a blockchain protocol of the blockchain network.

21. The non-transitory machine-readable storage medium of claim 18, wherein the request comprises the training data, the test data and the validation results.

22. The non-transitory machine-readable storage medium of claim 21, wherein updates to the software program are controlled by a regulatory policy and wherein the request further comprises compliance information that affirms or documents compliance with the regulatory policy in association with generation and utilization of the training data, the test data and the validation results.

23. The non-transitory machine-readable storage medium of claim 22, wherein the software program comprises a medical device product.

* * * * *